United States Patent
Adcock et al.

(10) Patent No.: US 10,628,724 B1
(45) Date of Patent: Apr. 21, 2020

(54) SPLIT CREDIT CARD

(71) Applicant: Capital One Services, LLC, McLean, VA (US)

(72) Inventors: Lee Adcock, Midlothian, VA (US); Christopher Camenares, Falls Church, VA (US); Geeta Shyamala, Herndon, VA (US); Vincent Pham, Champaign, IL (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/682,887

(22) Filed: Nov. 13, 2019

(51) Int. Cl.
| | | |
|---|---|---|
| *G06K 5/00* | (2006.01) | |
| *G06K 7/08* | (2006.01) | |
| *G06K 19/06* | (2006.01) | |
| *G06K 19/07* | (2006.01) | |

(52) U.S. Cl.
CPC ... *G06K 19/0723* (2013.01); *G06K 19/06187* (2013.01)

(58) Field of Classification Search
USPC .......................... 235/380, 449, 451, 492, 493
See application file for complete search history.

(56) References Cited

U.S. PATENT DOCUMENTS

| | | |
|---|---|---|
| 3,511,181 A | 5/1970 | McGiffen et al. |
| 3,583,317 A | 6/1971 | Gibson |
| 3,605,619 A | 9/1971 | Gilstrap |
| 3,650,210 A | 3/1972 | Archer |
| 5,538,291 A | 7/1996 | Gustafson |
| 5,818,030 A | 10/1998 | Reyes |
| 6,006,988 A * | 12/1999 | Behrmann .............. G07F 7/025 235/379 |
| 6,883,718 B1 * | 4/2005 | Le ......................... G06K 19/04 235/441 |
| 8,308,194 B2 * | 11/2012 | Wilen .................... B42D 1/006 235/380 |
| 10,331,989 B1 | 6/2019 | Benkreira et al. |
| 2002/0040935 A1 * | 4/2002 | Weyant .................. G07C 9/20 235/487 |
| 2004/0218518 A1 * | 11/2004 | Liu ...................... G06K 19/083 369/292 |

(Continued)

FOREIGN PATENT DOCUMENTS

KR 20060089585 A 8/2006

*Primary Examiner* — Tuyen K Vo
(74) *Attorney, Agent, or Firm* — Venable LLP; Jeffri A. Kaminski

(57) ABSTRACT

A separable or split transaction card may be a transaction card that is separable into multiple parts. The transaction card may be separable into multiple portions through an axis that extends through one or more pieces of personal identification information. The transaction card may transition between two or more configurations. A first configuration may be one in which the multiple card portions are not connected, all of the separated pieces of personal identification information are disabled, and the transaction card is disabled. A second configuration may be one in which the multiple card portions are connected, one or more of the separated pieces of personal identification information are enabled, and the transaction card is enabled and may be read when inserted into a card reading machine.

22 Claims, 11 Drawing Sheets

(56) References Cited

U.S. PATENT DOCUMENTS

| | | | | |
|---|---|---|---|---|
| 2004/0237360 | A1* | 12/2004 | Nelms | A45C 11/182 40/124.04 |
| 2006/0255161 | A1* | 11/2006 | Bonneau, Jr. | G06K 19/04 235/492 |
| 2007/0252010 | A1* | 11/2007 | Gonzalez | G06K 19/077 235/492 |
| 2009/0039154 | A1* | 2/2009 | Williams | G06K 19/04 235/380 |
| 2009/0236430 | A1* | 9/2009 | Webb | G06K 19/044 235/492 |
| 2011/0062242 | A1* | 3/2011 | Cowcher | G06K 19/07327 235/492 |
| 2011/0062243 | A1* | 3/2011 | Heusmann | G06K 19/07722 235/492 |
| 2016/0110639 | A1* | 4/2016 | Finn | G06K 19/07788 235/439 |

\* cited by examiner

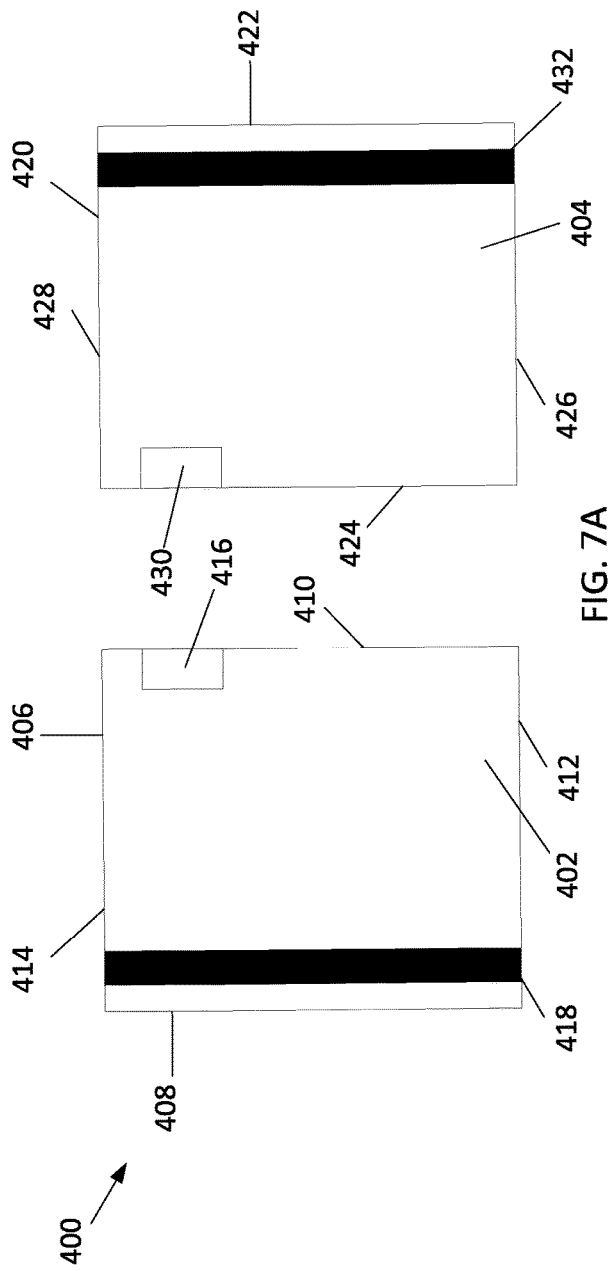
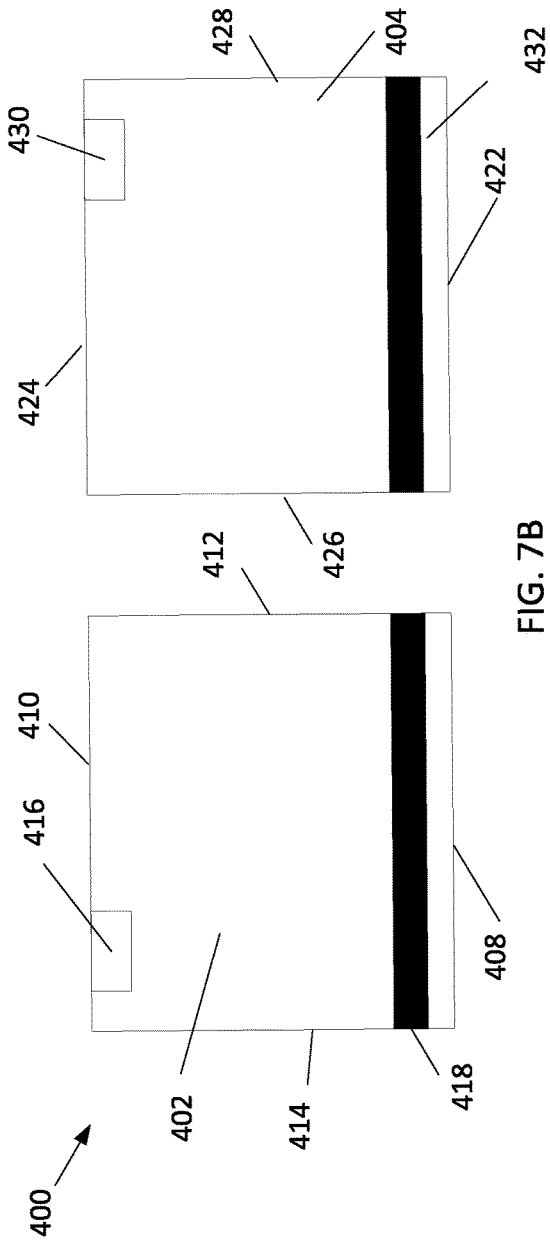
FIG. 7A
FIG. 7B

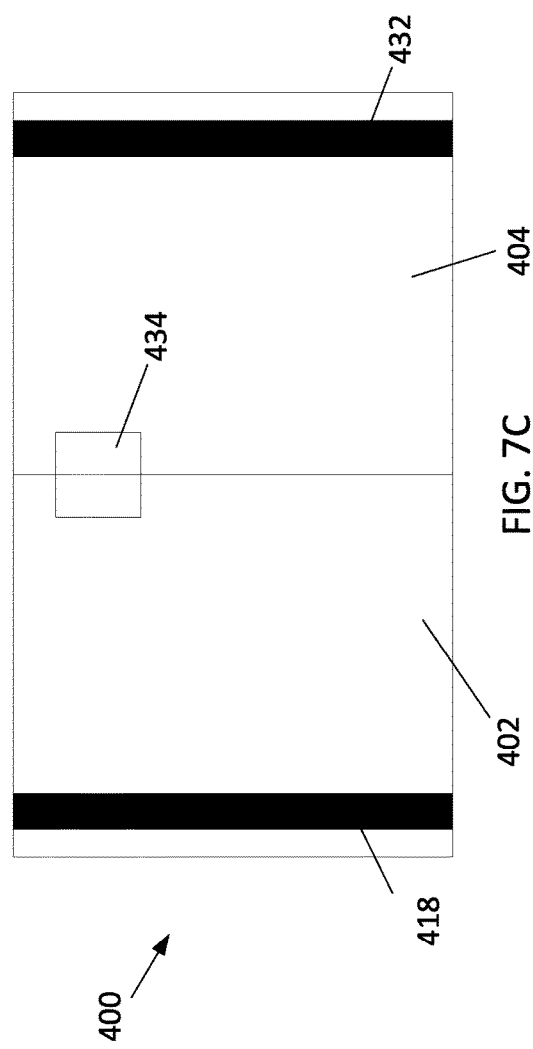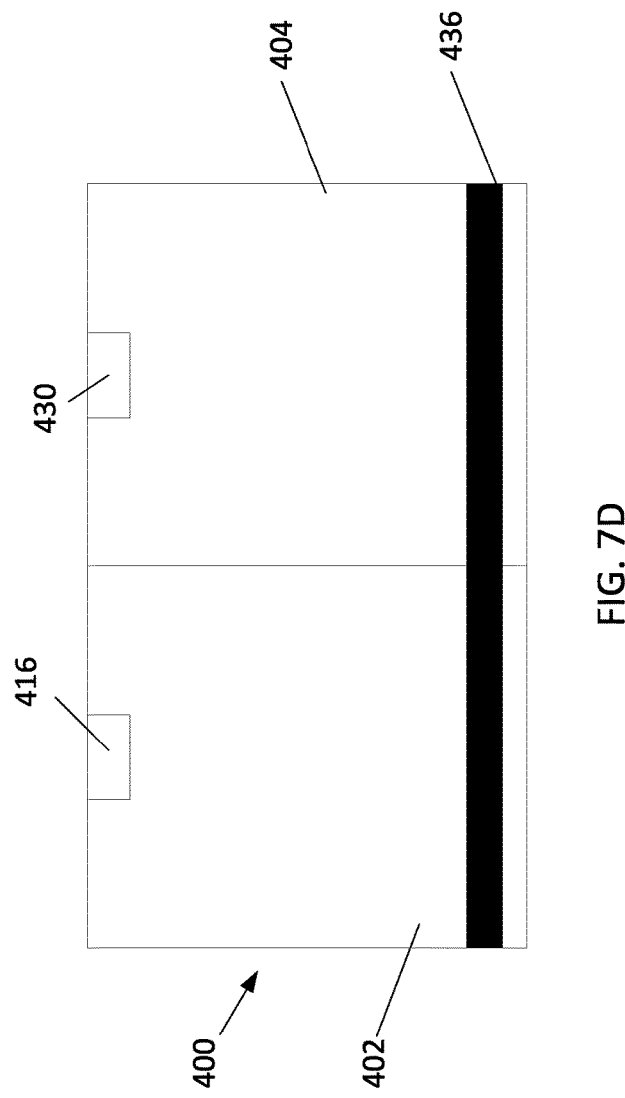

SPLIT CREDIT CARD

TECHNICAL FIELD

Embodiments of the present invention relates generally to a transaction card formed of more than one component and, more particularly, a credit card divided into pieces.

BACKGROUND

Currently, transaction cards, such as credit and debit cards, are formed as a single card, that is, the card is one piece. The card may include personal information on the card. The personal information may include the authorized user's name, account number, a chip, integrated circuit, and/or magnetic stripe associated with the authorized user and the authorized user's account. Such a transaction card is easily stolen and lost. When a third party achieves possession of these transaction cards, the third party, even if not the authorized user, may use the transaction card and/or may use the authorized user's information contained therein. Additionally, where the transaction card is associated with more than one authorized user, only a single authorized user is needed to complete a transaction. Thus, one authorized user may use the transaction card without the knowledge and/or permission of the additional authorized user(s). Therefore, a need exists for a secure transaction card which reduces and/or prevents theft. A need further exists for a secure transaction card which allows for two-person authentication for the transaction card to be used.

BRIEF SUMMARY

According to an embodiment, a transaction card may include a first card portion having a first card portion outer perimeter, the first card portion including: a first portion of a magnetic stripe located closer to a first side of the first card portion outer perimeter than to a second side of the first card portion outer perimeter, the second side of the first card portion outer perimeter being opposite the first side of the first card portion outer perimeter; and a first portion of a chip located at the second side of the first card portion outer perimeter; and a second card portion having a second card portion outer perimeter, the second card portion including: a second portion of the magnetic stripe located closer to a first side of the second card portion outer perimeter than to a second side of the second card portion outer perimeter, the second side of the second card portion outer perimeter being opposite the first side of the second card portion outer perimeter; and a second portion of the chip located at the second side of the second card portion outer perimeter; and wherein the first card portion and the second card portion are removably coupleable to each other to form a first configuration and a second configuration, and wherein: in the first configuration, a third side of the first card portion outer perimeter is removably coupled to a third side of the second card portion outer perimeter, the first portion of the magnetic stripe aligns with the second portion of the magnetic stripe, and the magnetic stripe is readable by a magnetic stripe reader, and in the second configuration, the second side of the first card portion outer perimeter is removably coupled to the second side of the second card portion outer perimeter, the first portion of the chip aligns with the second portion of the chip, and the chip is readable by a chip reader.

According to an embodiment, a transaction card may include a first card portion having a first card portion outer perimeter, the first card portion including: a first portion of a chip located closer to a first side of the first card portion outer perimeter than to a second side of the first card portion outer perimeter, the second side of the first card portion outer perimeter being opposite the first side of the first card portion outer perimeter; and a first portion of a magnetic stripe located closer the second side of the first card portion outer perimeter than to the first side of the first card portion outer perimeter; and a second card portion having a second card portion outer perimeter, the second card portion including: a second portion of the chip located closer to a first side of the second card portion outer perimeter than to a second side of the second card portion outer perimeter, the second side of the second card portion outer perimeter being opposite the first side of the second card portion outer perimeter; and a second portion of the magnetic stripe located closer to the second side of the second card portion outer perimeter than to the first side of the second card portion outer perimeter; and wherein the first card portion and the second card portion are removably coupleable to each other to form a connected configuration, and wherein: in the connected configuration, a third side of the first card portion outer perimeter is removably coupled to a third side of the second card portion outer perimeter, the first portion of the chip aligns with the second portion of the chip, the first portion of the magnetic stripe aligns with the second portion of the magnetic stripe.

According to an embodiment, a transaction card may include a first card portion having a first card portion outer perimeter, the first card portion including: a first portion of a magnetic stripe located closer to a first side of the first card portion outer perimeter than to a second side of the first card portion outer perimeter, the second side of the first card portion outer perimeter being opposite the first side of the first card portion outer perimeter; and a first portion of a chip located at the second side of the first card portion outer perimeter; and a second card portion having a second card portion outer perimeter, the second card portion including: a second portion of the magnetic stripe located closer to a first side of the second card portion outer perimeter than to a second side of the second card portion outer perimeter, the second side of the second card portion outer perimeter being opposite the first side of the second card portion outer perimeter; and a second portion of the chip located at the second side of the second card portion outer perimeter; and the first card portion and the second card portion are removably coupleable to each other to form a first configuration and a second configuration, wherein: in the first configuration, the first portion of the magnetic stripe aligns with the second portion of the magnetic stripe, and the magnetic stripe is readable by a magnetic stripe reader, and in the second configuration, the first portion of the chip aligns with the second portion of the chip, and the chip is readable by a chip reader.

BRIEF DESCRIPTION OF DRAWINGS

The description below refers to the following drawings of which:

FIG. 7A shows a view of an exemplary transaction card in a first configuration.

FIG. 7B shows a view of an exemplary transaction card in a second configuration.

FIG. 7C shows a view of an exemplary transaction card in a third configuration.

FIG. 7D shows view of an exemplary transaction card in a fourth configuration.

DETAILED DESCRIPTION

Figure 1A:
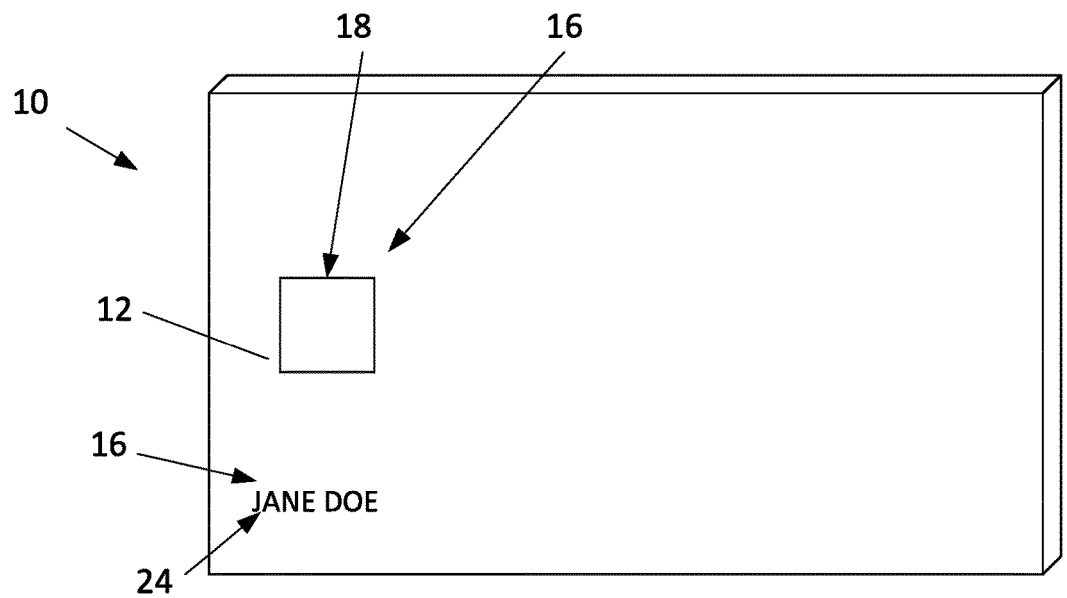
FIG. 1A shows a perspective view of an exemplary transaction card.

The present disclosure relates to a transaction card that may be separable into multiple parts. The transaction card may be separable into multiple portions along an axis that extends through one or more pieces of personal identification information (e.g., an integrated circuit, chip, magnetic stripe, authorized user's name, account number, signature, etc.). The transaction card may thus transition between two or more configurations. A first configuration may be one in which the multiple card portions are not connected and the separated pieces of personal identification information are disabled. In this configuration, the transaction card is entirely disabled and may not be read, for example, when inserted into a card reading machine and/or may be incapable of being inserted into a card reading machine. A second configuration may be one in which the multiple card portions are connected and one or more of the separated pieces of personal identification information are enabled. In this configuration, the transaction card is enabled and may be read, for example, when inserted into a card reading machine, via near field communication (e.g., tap and pay, contactless cards), etc. In some examples, the second configuration may further include multiple configurations in which in one of the configurations a first piece of personal identification information is enabled and a second piece of personal identification information is disabled and another of the configurations the first piece of personal identification information is disabled and the second piece of personal identification information is enabled.

The transaction card described herein improves upon conventional transaction cards. A conventional transaction card is a single card of a predetermined width and length. The conventional transaction card is always enabled and requires only a single user authentication. The transaction card of example embodiments described in the present disclosure splits or divides a transaction card into one or more separate portions that may have a width and/or length less than the conventional width and/or length of the conventional transaction card.

In an example, the transaction card may be linked to an account with more than one authorized user. Each authorized user may carry one of the portions of the separated transaction card. To complete a transaction, each of the authorized users may provide their portion to form the complete transaction card and thus authorize the transaction. If one of the authorized users does not authorize the transaction, they may withhold their portion of the transaction card. This may result in an incomplete transaction card that is not readable. For example, an account may be jointly owned by a married couple, parent(s) and child(ren), partners in a business, etc. In an example, the parent may hold a first portion of the card and the child may hold the second portion of the card. In order to authorize a transaction, the child may need to obtain the first portion of the card from the parent. Thus, the parent may have control over purchases and transactions performed by the child. Such multiparty/multifactor authentication may reduce the likelihood of unauthorized purchases or transactions. Multifactor authentication may occur when two or more authorized users come together to complete the transaction. Additionally, the multifactor authentication may include authentication back to a mobile application or device. All authorized users of an account may receive notification of a completed transaction.

The separable transaction card may also reduce the likelihood of theft. An authorized user(s) may store the portions of the transaction card separately (e.g., one portion in a wallet another portion in a desk or pocket, etc.). If the authorized user's wallet is lost or stolen, a first portion of the transaction card may be the only portion lost and/or stolen. The thief or finder of the wallet may be unable to use the transaction card without the second portion of the transaction card (e.g., the portion still in the position of the authorized user).

Details of exemplary transaction cards to achieve the aforementioned advantages and benefits of a separable transaction card are described herein. However, alternatives to the structure, layout, shape, size, arrangement, etc., are contemplated without departing from the goals of providing a multifactor authenticated transaction card and/or a transaction card with reduced likelihood of theft.

Figure 1B:
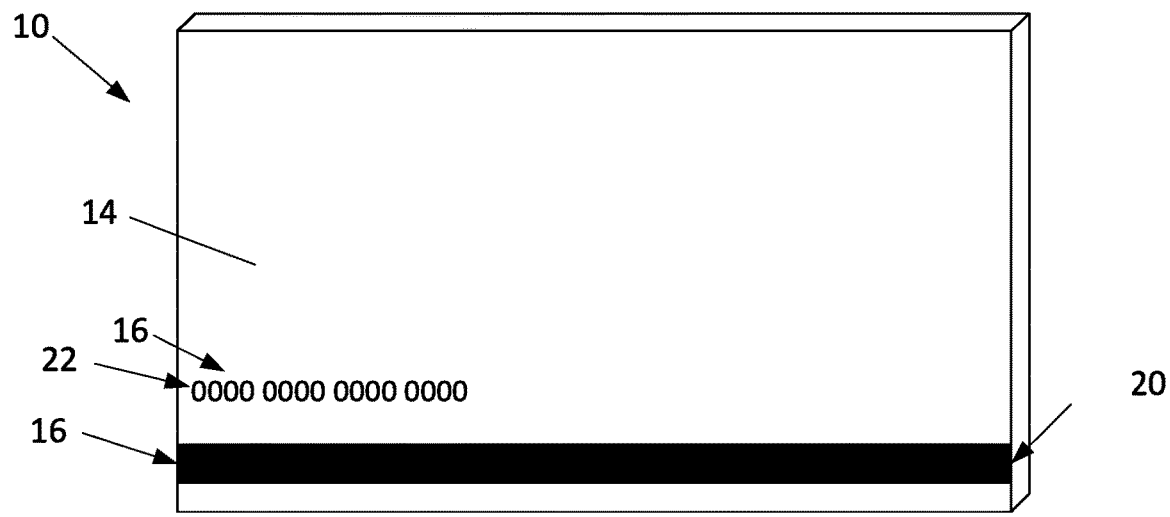
FIG. 1B shows a perspective view of an exemplary transaction card.

Referring to FIGS. 1A and 1B, a perspective view of a transaction card 10 is shown. The transaction card 10 may be a credit card, a debit card, or other card with personal identification information. The transaction card 10 may be a card that is able to be read by a card reading machine, via near field communication, wirelessly, or other means. The transaction card 10 may be of a predetermined size and shape such that the transaction card 10 engages with a card reading machine. For example, the transaction card 10 may be a rectangular shape, square shape, or other shape.

With continued reference to FIGS. 1A and 1B, the transaction card may have a front surface 12 and a rear surface 14. The transaction card 10 may include personal identification information 16. The personal identification information 16 may be an integrated circuit or chip 18, a magnetic stripe 20, an account number 22, an authorized user's name 24, or combinations thereof. Although a single instance of each of the personal identification information 16 is shown, more or fewer of each may be provided. For example, only a magnetic stripe 20 may be provided. For example, only a chip 18 may be provided. Other types of personal identification information 16 may be provided, alone or in combination with the examples described herein.

Referring again to FIGS. 1A and 1B, the personal identification information 16 may be provided on the front surface 12, the rear surface 14, or both the front surface 12 and the rear surface 14. For example, the chip 18 and/or the authorized user's name 24 may be provided on the front surface 12. For example, the magnetic stripe 20 and/or the account number 22 may be provided on the rear surface 14. Alternative arrangements of the personal identification information 16 are contemplated. For example, the chip 18 and/or the magnetic stripe 20 may be provided on the front surface 12 and/or the rear surface 14.

Figure 2A:
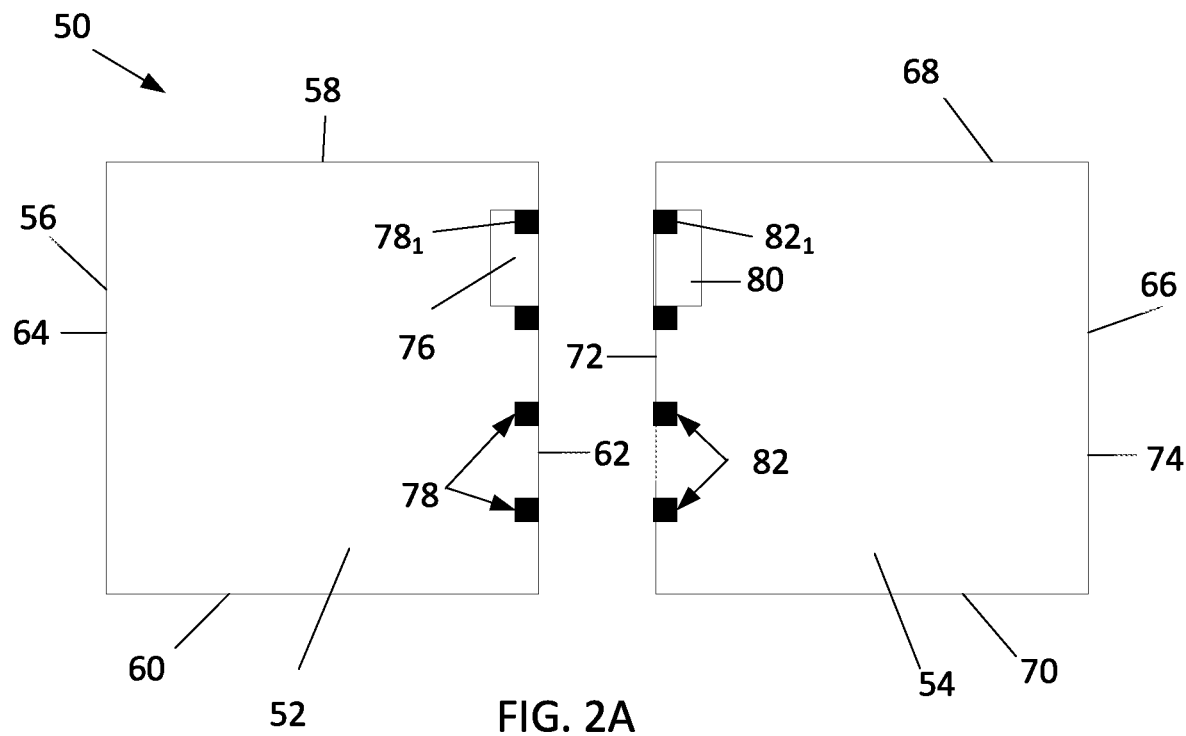
FIG. 2A shows a view of an exemplary transaction card in a first configuration.
Figure 2B:
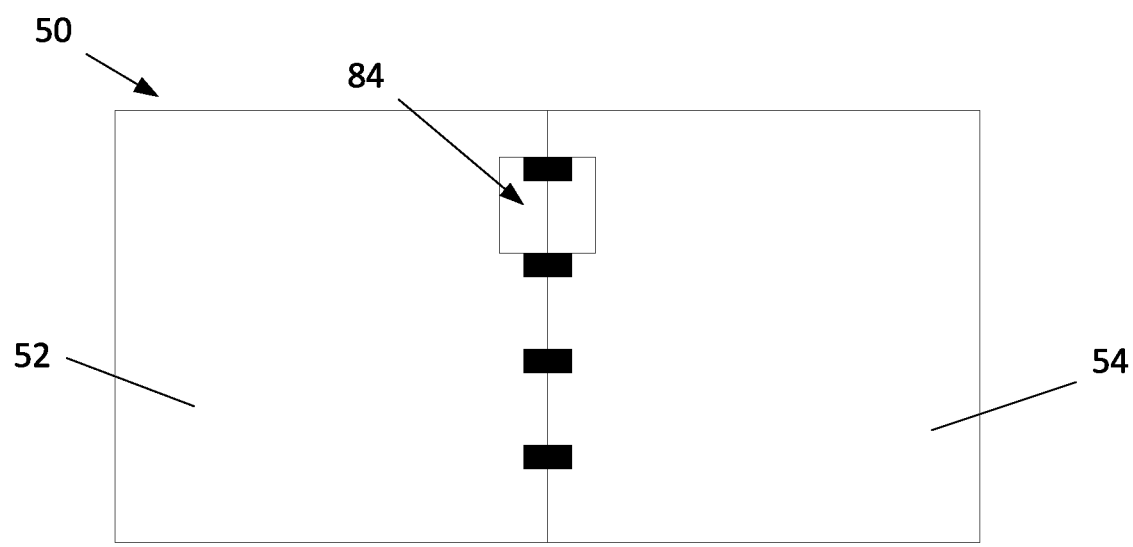
FIG. 2B shows a view of the exemplary transaction card of FIG. 2A in a second configuration.

Referring to FIGS. 2A and 2B, a view of a transaction card 50 is shown. The transaction card 50 may be the same or similar as the transaction card 10. The transaction card 50 may include any of the aforementioned features and variations described with respect to transaction card 10. The transaction card 50 may include a first card portion 52 and a second card portion 54.

The first card portion 52 may have an outer periphery or perimeter 56. The first card portion 52 may have a first side 58, a second side 60, a third side 62, and a fourth side 64. The first card portion 52 may include a chip portion 76. The chip portion 76 may be located closer to the first side 58 than to the second side 60. The first side 58 may be opposite the second side 60. Although shown and described as square or rectangular, the first card portion 52 may be any shape, include triangular, pentagonal, hexagonal, polygonal, spherical, semi-spherical, etc.

The first card portion 52 may include a connector 78. The connector 78 may be one or more connectors 78. The connector 78 may be located along the third side 62 of the first card portion 52. The connector 78 may be located along the first side 58, the second side 60, the third side 62, the fourth side 64, or combinations thereof. Although four connectors 78 are shown, more or fewer may be provided. The connector 78 may include at least one connector that overlaps at least a portion of the chip portion 76. For example, the connector $78_1$ may overlap, at least partially or entirely, the chip portion 76. The overlap may be such that some or all of the connector $78_1$ is at the same position along the third side 62 as some or all of the chip portion 76.

The second card portion 54 may have an outer periphery or perimeter 66. The second card portion 54 may have a first side 68, a second side 70, a third side 72, and a fourth side 74. The second card portion 54 may include a chip portion 80. The chip portion 80 may be located closer to the first side 68 than to the second side 70. The first side 68 may be opposite the second side 70. Although shown and described as square or rectangular, the second card portion 54 may be any shape, include triangular, pentagonal, hexagonal, polygonal, spherical, semi-spherical, etc.

The second card portion 54 may include a connector 82. The connector 82 may be one or more connectors 82. The connector 82 may be located along the third side 72 of the second card portion 54. The connector 82 may be located along the first side 68, the second side 70, the third side 72, the fourth side 74, or combinations thereof. Although four connectors 82 are shown, more or fewer may be provided. The connector 82 may include at least one connector that overlaps at least a portion of the chip portion 80. For example, the connector $82_1$ may overlap, at least partially or entirely, the chip portion 80. The overlap may be such that some or all of the connector $82_1$ is at the same position along the third side 72 as some or all of the chip portion 80. The number of connectors 78 may correspond to the number of connectors 82.

The transaction card 50 may have a first configuration (FIG. 2A) and a second configuration (FIG. 2B). The first card portion 52 and the second card portion 54 may be removably coupleable or connectable. That is, in the first configuration of FIG. 2A, the first card portion 52 and the second card portion 54 may be separate or not coupled. The first configuration may be a disconnected configuration. In the first configuration, the connectors 78 and 82 may be disengaged or disconnected. In the first configuration, the transaction card 50 may be incomplete or inoperable. That is, in the first configuration, the transaction card 50 may not be readable, for example, by a chip reader. In the first configuration, the transaction card 50 may not be authorized to perform transactions. In the first configuration, the transaction card 50 may be incomplete and may include an incomplete chip (e.g., comprised of chip portions 76, 80 not coupled together). Inserting the first card portion 52 and/or the second card portion 54 into a card reading machine (or otherwise attempting to complete a transaction) may result in the transaction card 50 being unreadable by the machine. In this configuration, a transaction may not be completed and may not be authorized.

In the second configuration of FIG. 2B, the first card portion 52 and the second card portion 54 may be coupled or connected. The second configuration may be a connected configuration. In the second configuration, the connectors 78 and 82 may be coupled, connected, or otherwise latched together. In the second configuration, the transaction card 50 may be complete or operable. That is, in the second configuration, the transaction card 50 may be readable, for example, by a chip reading machine. In the second configuration, the transaction card 50 may be authorized to perform transactions.

In the second configuration of FIG. 2B, the transaction card 50 is shown with the first card portion 52 and the second card portion 54 aligned and coupled together such that a complete or whole transaction card 50 is formed. When coupled or aligned, the first chip portion 76 and the second chip portion 80 may form a whole or complete chip 84. The complete chip 84 may be readable in a chip reader. The complete chip 84 may indicate the transaction card 50, and thus the user, is authorized to perform a transaction. That is, when the complete transaction card 50 is inserted into a conventional chip reading machine (e.g., by insertion into the chip reader or otherwise attempting to complete a transaction), the user's account may be authorized to complete the transaction and the respective monetary amount of the transaction may be posted to the user's account.

The one or more connectors 78, 82 may be magnets. When respective connectors are aligned, the magnets may be magnetically attracted to each other to couple the first card portion 52 and the second card portion 54 to form the transaction card 50. The magnets may maintain the transaction card 50 in the complete or whole configuration. One or more locks may be provided to maintain the transaction card 50 in the complete or whole configuration after coupling of the magnets. Although shown and described as magnetic connectors, other connection types are contemplated, such as, for example male and female connections, protrusions, indents, snap connections, slide connections, toggles, removable adhesive, etc.

Figure 3A:
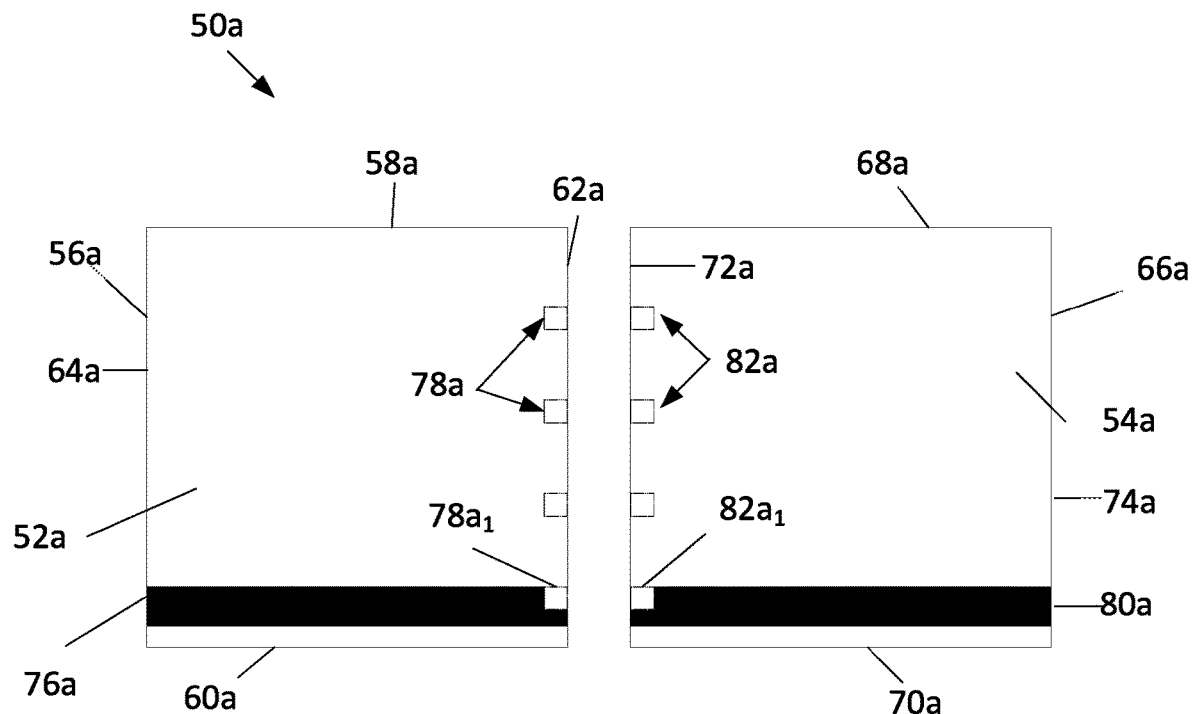
FIG. 3A shows a view of an exemplary transaction card in a first configuration.
Figure 3B:
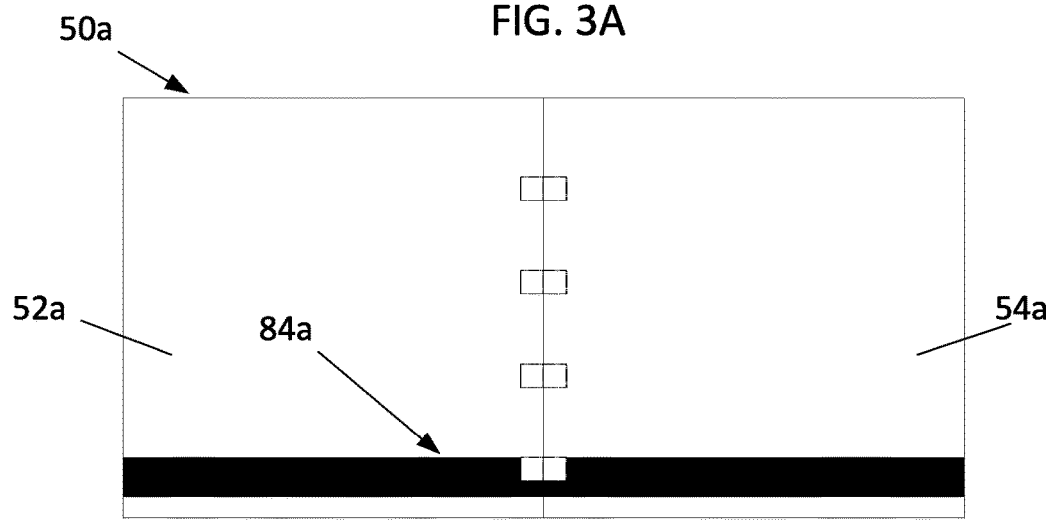
FIG. 3B shows a view of the exemplary transaction card of FIG. 3A in a second configuration.

Referring to FIGS. 3A and 3B, a view of a transaction card 50a is shown. The transaction card 50a may be the same or similar as the transaction card 10 and/or the transaction card 50. The transaction card 50a may include any of the aforementioned features and variations described with respect to transaction card 10 and/or the transaction card 50. The transaction card 50a may include a first card portion 52a and a second card portion 54a.

The first card portion 52a may have an outer periphery or perimeter 56a. The first card portion 52a may have a first side 58a, a second side 60a, a third side 62a, and a fourth side 64a. The first card portion 52a may include a magnetic stripe portion 76a. The magnetic stripe portion 76a may be located closer to the second side 60a then to the first side 58a. The first side 58a may be opposite the second side 60a. Although shown and described as square or rectangular, the first card portion 52a may be any shape, include triangular, pentagonal, hexagonal, polygonal, spherical, semi-spherical, etc.

The first card portion 52a may include a connector 78a. The connector 78a may be one or more connectors 78a. The connector 78a may be located along the third side 62a of the first card portion 52a. The connector 78a may be located along the first side 58a, the second side 60a, the third side 62a, the fourth side 64a, or combinations thereof. Although four connectors 78a are shown, more or fewer may be provided. The connector 78a may include at least one connector that overlaps at least a portion of the magnetic stripe portion 76a. For example, the connector $78a_1$ may overlap, at least partially or entirely, the magnetic stripe portion 76a. The overlap may be such that some or all of the connector $78a_1$ is at the same position along the third side 62a as some or all of the magnetic stripe portion 76a.

The second card portion 54a may have an outer periphery or perimeter 66a. The second card portion 54a may have a first side 68a, a second side 70a, a third side 72a, and a fourth side 74a. The second card portion 54a may include a magnetic stripe portion 80a. The magnetic stripe portion 80a may be located closer to the second side 70a than to the first side 68a. The first side 68a may be opposite the second side 70a. Although shown and described as square or rectangular, the second card portion 54a may be any shape, include triangular, pentagonal, hexagonal, polygonal, spherical, semi-spherical, etc.

The second card portion 54a may include a connector 82a. The connector 82a may be one or more connectors 82a. The connector 82a may be located along the third side 72a of the second card portion 54a. The connector 82a may be located along the first side 68a, the second side 70a, the third side 72a, the fourth side 74a, or combinations thereof. Although four connectors 82a are shown, more or fewer may be provided. The connector 82a may include at least one connector that overlaps at least a portion of the magnetic stripe portion 80a. For example, the connector $82a_1$ may overlap, at least partially or entirely, the magnetic stripe portion 80a. The overlap may be such that some or all of the connector $82a_1$ is at the same position along the third side 72a as some or all of the magnetic stripe portion 80a. The number of connectors 78a may correspond to the number of connectors 82a.

The transaction card 50a may have a first configuration (FIG. 3A) and a second configuration (FIG. 3B). The first card portion 52a and the second card portion 54a may be removably coupleable or connectable. That is, in the first configuration of FIG. 3A, the first card portion 52a and the second card portion 54a may be separate or not coupled. The first configuration may be a disconnected configuration. In the first configuration, the connectors 78a and 82a may be disengaged or disconnected. In the first configuration, the transaction card 50a may be incomplete or inoperable. That is, in the first configuration, the transaction card 50a may not be readable, for example, by a magnetic stripe reader. In the first configuration, the transaction card 50a may not be authorized to perform transactions. In the first configuration, the transaction card 50a may be incomplete and may include an incomplete magnetic stripe (e.g., comprised of magnetic stripe portions 76a, 80a not coupled together). Inserting the first card portion 52a and/or the second card portion 54a into a magnetic stripe reading machine (or otherwise attempting to complete a transaction) may result in the transaction card 50a being unreadable by the machine. In this configuration, a transaction may not be completed and may not be authorized.

In the second configuration of FIG. 3B, the first card portion 52a and the second card portion 54a may be coupled or connected. The second configuration may be a connected configuration. In the second configuration, the connectors 78a and 82a may be coupled, connected, or otherwise latched together. In the second configuration, the transaction card 50a may be complete or operable. That is, in the second configuration, the transaction card 50a may be readable, for example, by a magnetic stripe reader. In the second configuration, the transaction card 50a may be authorized to perform transactions.

In the second configuration of FIG. 3B, the transaction card 50a is shown with the first card portion 52a and the second card portion 54a aligned and coupled together such that a complete or whole transaction card 50a is formed. When coupled or aligned, the first magnetic stripe portion 76a and the second magnetic stripe portion 80a may form a whole or complete magnetic stripe 84a. The complete magnetic stripe 84a may be readable, for example, in a magnetic stripe reader. The complete magnetic stripe 84a may indicate the transaction card 50a, and thus the user, is authorized to perform a transaction. That is, when the complete transaction card 50a is inserted into a conventional magnetic stripe reading machine (e.g., by swiping the magnetic stripe along the reader or otherwise attempting to complete a transaction), the user's account may be authorized to complete the transaction and the respective monetary amount of the transaction may be posted to the user's account.

The one or more connectors 78a, 82a may be magnets. When respective connectors are aligned, the magnets may be magnetically attracted to each other to couple the first card portion 52a and the second card portion 54a to form the transaction card 50a. The magnets may maintain the transaction card 50a in the complete or whole configuration. One or more locks may be provided to maintain the transaction card 50a in the complete or whole configuration after coupling of the magnets. Although shown and described as magnetic connectors, other connection types are contemplated, such as, for example male and female connections, protrusions, indents, snap connections, slide connections, toggles, removable adhesive, etc.

Referring to both FIGS. 2 and 3, the transaction card 50 and the transaction card 50a may be different transaction cards. In an exemplary embodiment, the transaction card 50 and the transaction card 50a may be the same transaction card. In an exemplary embodiment, the transaction card may include the chip on one side of the card and the magnetic stripe on the other side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine. In an exemplary embodiment, the transaction card may include the chip and the magnetic stripe on the same side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine.

Although FIGS. 2 and 3, and the exemplary embodiment where FIGS. 2 and 3 are combined, show and describe the chip and the magnetic stripe having separate portions coupled together, other account information may be provided. For example, the user's name, the user's account number, the user's address, the user's signature, etc. may be provided in two or more portions such that in one configuration the information is separated and in another configuration, the information is complete. Any number of pieces of account information may be removably coupleable on the transaction card. Although described as separated into two portions, more portions may be provided. Although described as magnetic stripes and chips, other types may also be provided. Where more than two portions are provided, additional connectors may be provided on additional sides to allow for coupling of the additional card portions together.

In FIGS. 2 and 3, the one or more connectors may be located on the front surface, the rear surface, a side surface of the transaction card (e.g., a surface perpendicular to the front surface), within the body of the transaction card, or combinations thereof. Although depicted along the third side, the one or more connectors may be provided on the opposing side or one of the adjacent sides, or any combination thereof. The one or more connectors may be located such that they align with a respective one of the one or more connectors on another card portion. A user may align the sides of the card portions also aligning respective connectors on each side. In this manner, when aligned, the card portions may form a complete transaction card.

Figure 4A:
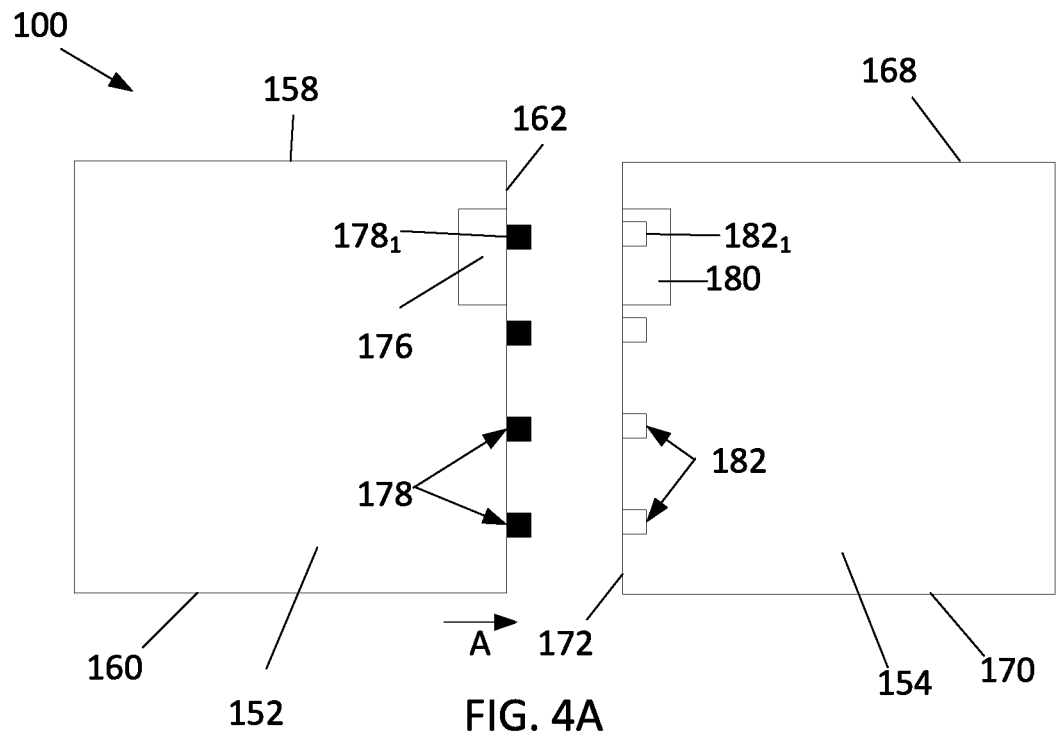
FIG. 4A shows a view of an exemplary transaction card in a first configuration.
Figure 4B:
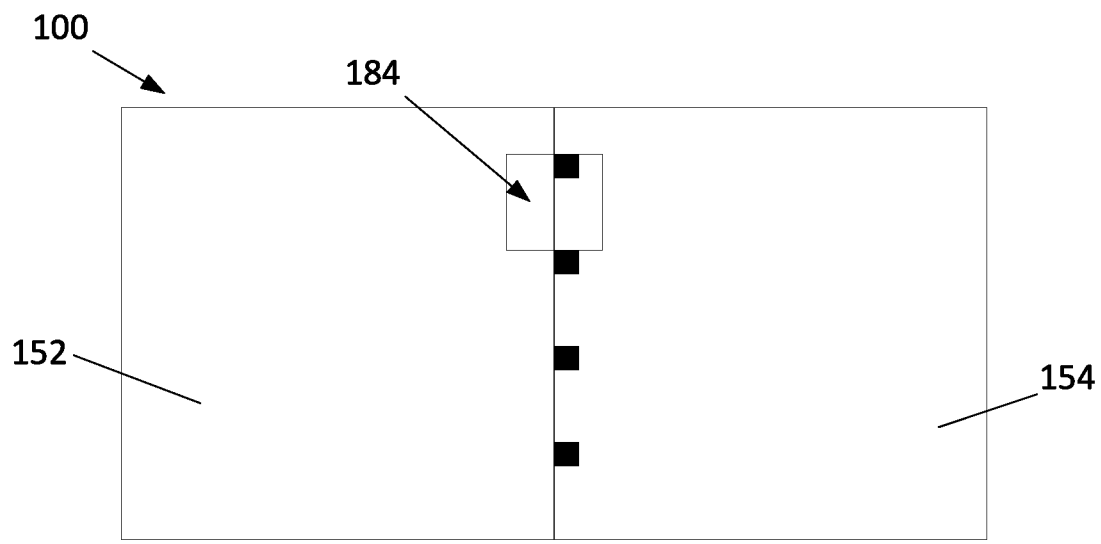
FIG. 4B shows a view of the exemplary transaction card of FIG. 4A in a second configuration.

Referring to FIGS. 4A and 4B, transaction card 100 is shown. The transaction card 100 may be the same or similar as the transaction cards 10, 50, and/or 50a. The transaction card 100 may include any of the aforementioned features and variations described with respect to transaction cards 10, 50, and/or 50a. Features not described with respect to FIGS. 4A and 4B may be the same or similar as features previously described. The transaction card 100 may include a first card portion 152 and a second card portion 154. The first card portion 152 may include a chip portion 176 located closer to a first side 158 than a second side 160, as described with respect to FIGS. 2A and 2B. The second card portion 154 may include a chip portion 180 located closer to a first side 168 than to a second side 170, as described with respect to FIGS. 2A and 2B. The first card portion 152 may include one or more connectors 178. At least one of the connectors 178$_1$ may overlap at least a portion of the chip portion 176, as described with respect to FIGS. 2A and 2B. The second card portion 154 may include one or more connectors 182. At least one of the connectors 182$_1$ may overlap at least a portion of the chip portion 180, as described with respect to FIGS. 2A and 2B. Although four connectors are shown, more or fewer may be provided. The number of connectors on each card portion may be complimentary with the other card portion. The connectors may be positioned such that they are aligned with connectors on the other card portion.

The one or more connectors 178, 182 may be mechanical couplings. For example, the one or more connectors 178 may be male connectors and the one or more connectors 182 may be female connectors. For example, the one or more connectors 178 may be protrusions sized and shaped to fit within the one or more connectors 182. The one or more connectors 178 may protrude away from the third side 162 in the direction of the arrow A. The one or more connectors 178 may be protrusions, pins or other extending member that extend outwardly from the first card portion 152. The one or more connectors 182 may be recesses, slots, grooves, etc. sized and shaped to receive the one or more connectors 178. The one or more connectors 182 may recess inwardly from the third side 172. Although depicted as rectangular protrusions and recesses, the one or more connectors 178, 182 may be any complementary shapes (e.g., triangular, polygonal, pentagonal, semi-spherical, etc.). When aligned, the protruding one or more connectors 178 may be inserted into the respective recessed one or more connectors 182. The male and female connectors may engage one other to couple the first card portion 152 and the second card portion 154 to form the complete transaction card 100. The male and female connectors may maintain the transaction card 100 in the complete or whole configuration. One or more locks may be provided to maintain the transaction card 100 in the complete or whole configuration after coupling of the male and female connectors. Although shown and described with the male connectors on the first card portion 152 and the female connectors on the second card portion 154, the arrangement may be reversed. Although shown and described as male and female mechanical connectors, other connection types are contemplated, such as, for example magnets, other protrusions, indents, snap connections, slide connections, toggles, removable adhesive, etc.

The transaction card 100 may have a first configuration (FIG. 4A) and a second configuration (FIG. 4B). The first card portion 152 and the second card portion 154 may be removably coupleable or connectable. That is, in the first configuration of FIG. 4A, the first card portion 152 and the second card portion 154 may be separate or not coupled. The first configuration may be a disconnected configuration. In the first configuration, the connectors 178 and 182 may be disengaged or disconnected. In the first configuration, the transaction card 100 may be incomplete or inoperable. That is, in the first configuration, the transaction card 100 may not be readable, for example, by a chip reader. In the first configuration, the transaction card 100 may not be authorized to perform transactions. In the first configuration, the transaction card 100 may be incomplete and may include an incomplete chip (e.g., comprised of chip portions 176, 180 not coupled together). Inserting the first card portion 152 and/or the second card portion 154 into a card reading machine may result in the transaction card 100 being unreadable by the machine. In this configuration, a transaction may not be completed and may not be authorized.

In the second configuration of FIG. 4B, the first card portion 152 and the second card portion 154 may be coupled or connected. The second configuration may be a connected configuration. In the second configuration, the connectors 178 and 182 may be coupled, connected, or otherwise latched together. In the second configuration, the transaction card 100 may be complete or operable. That is, in the second configuration, the transaction card 100 may be readable, for example, by a chip reader. In the second configuration, the transaction card 100 may be authorized to perform transactions.

In the second configuration of FIG. 4B, the transaction card 100 is shown with the first card portion 152 and the second card portion 154 aligned and coupled together (e.g., the connectors 178 are inserted into the connectors 182) such that a complete or whole transaction card 100 is formed. When coupled or aligned, the first chip portion 176 and the second chip portion 180 may form the whole or complete chip 184. The complete chip 184 may be readable, for example, in a chip reader. The complete chip 184 may indicate the transaction card 100, and thus the user, is authorized to perform a transaction. That is, when the complete transaction card 100 is inserted into a conventional chip reading machine (e.g., by insertion into the chip reader), the user's account may be authorized to complete the transaction and the respective monetary amount of the transaction may be posted to the user's account.

Figure 4C:
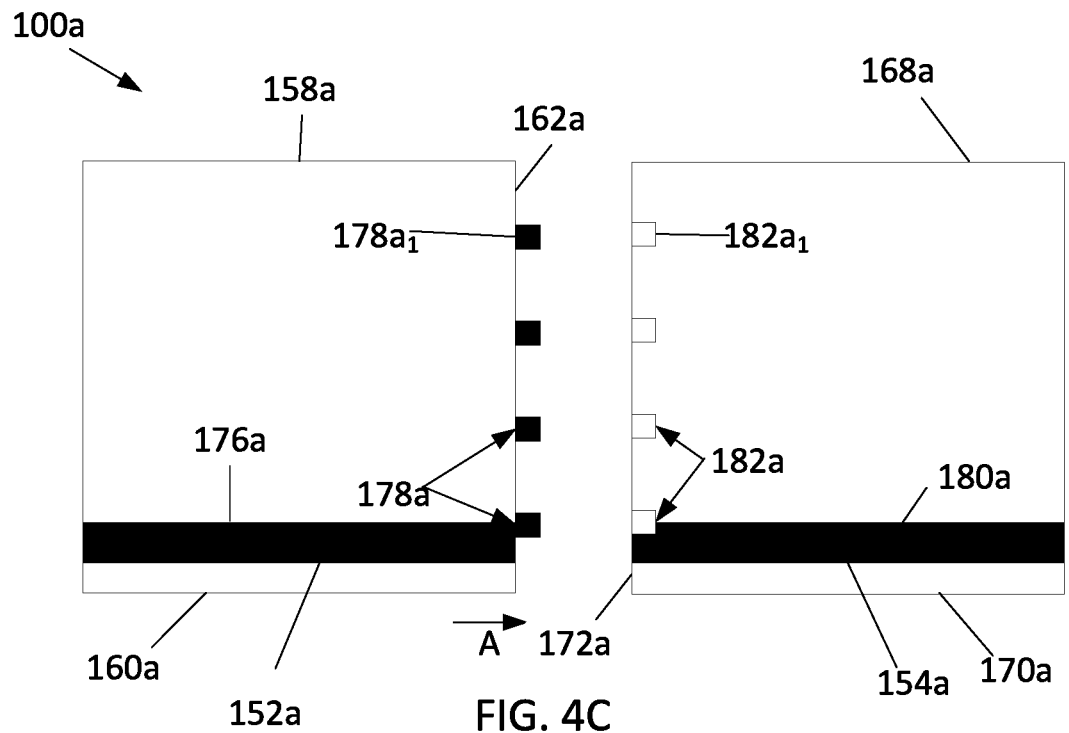
FIG. 4C shows a view of an exemplary transaction card in a first configuration.
Figure 4D:
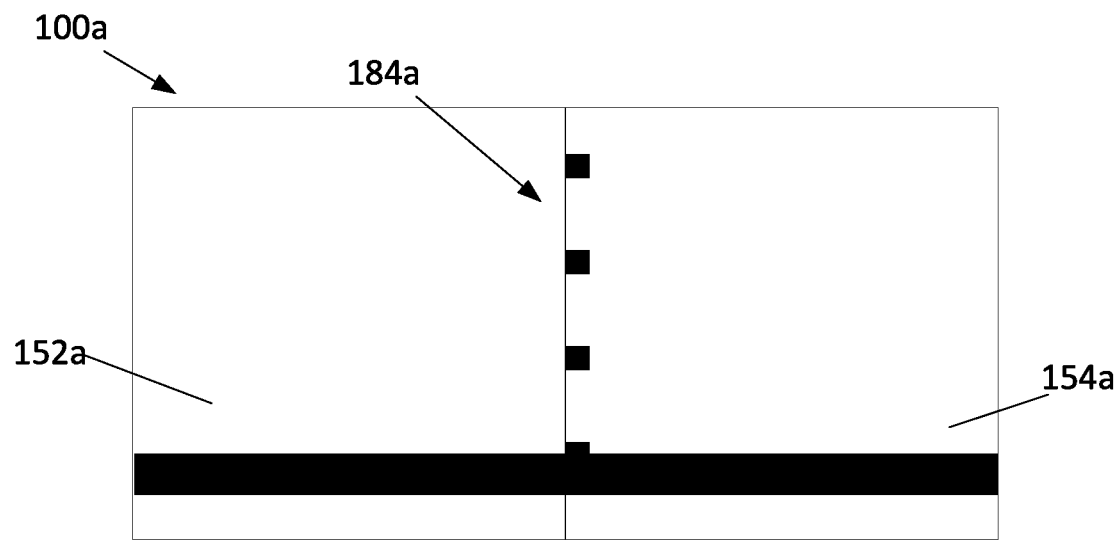
FIG. 4D shows a view of the exemplary transaction card of FIG. 4C in a second configuration.

Referring to FIGS. 4C and 4D, transaction card 100a is shown. The transaction card 100a may be the same or similar as the transaction cards 10, 50, 50a, and/or 100. The transaction card 100a may include any of the aforementioned features and variations described with respect to transaction cards 10, 50, 50a, and/or 100. Features not described with respect to FIGS. 4C and 4D may be the same or similar as features previously described. The transaction card 100a may include a first card portion 152a and a second card portion 154a. The first card portion 152a may include a magnetic stripe portion 176a located closer to a second side 160a than a first side 158a, as described with respect to FIGS. 3A and 3B. The second card portion 154a may include a magnetic stripe portion 180a located closer to a second side 170a than a first side 168a, as described with respect to FIGS. 3A and 3B. The first card portion 152a may include one or more connectors 178a. At least one of the connectors $178a_1$ may overlap at least a portion of the magnetic stripe portion 176a, as described with respect to FIGS. 3A and 3B. The second card portion 154a may include one or more connectors 182a. At least one of the connectors $182a_1$ may overlap at least a portion of the magnetic stripe portion 180a, as described with respect to FIGS. 3A and 3B. Although four connectors are shown, more or fewer may be provided. The number of connectors on each card portion may be complimentary with the other card portion. The connectors may be positioned such that they are aligned with connectors on the other card portion.

The one or more connectors 178a, 182a may be mechanical couplings, such as described with respect to FIGS. 4A and 4B. The one or more connectors 178a, 182a may have the same or similar features and/or variations and may operate in the same or similar manner as the connectors 178 and 182 as described with respect to FIGS. 4A and 4B.

The transaction card 100a may have a first configuration (FIG. 4C) and a second configuration (FIG. 4D). The first card portion 152a and the second card portion 154a may be removably coupleable or connectable. That is, in the first configuration of FIG. 4C, the first card portion 152a and the second card portion 154a may be separate or not coupled. The first configuration may be a disconnected configuration. In the first configuration, the connectors 178a and 182a may be disengaged or disconnected. In the first configuration, the transaction card 100a may be incomplete or inoperable. That is, in the first configuration, the transaction card 100a may not be readable, for example, by a magnetic stripe reader. In the first configuration, the transaction card 100a may not be authorized to perform transactions. In the first configuration, the transaction card 100a may be incomplete and may include an incomplete magnetic stripe (e.g., comprised of magnetic stripe portions 176a, 180a not coupled together). Inserting the first card portion 152a and/or the second card portion 154a into a magnetic stripe reading machine may result in the transaction card 100a being unreadable by the machine. In this configuration, a transaction may not be completed and may not be authorized.

In the second configuration of FIG. 4D, the first card portion 152a and the second card portion 154a may be coupled or connected. The second configuration may be a connected configuration. In the second configuration, the connectors 178a and 182a may be coupled, connected, or otherwise latched together. In the second configuration, the transaction card 100a may be complete or operable. That is, in the second configuration, the transaction card 100a may be readable, for example, by a magnetic stripe reader. In the second configuration, the transaction card 100a may be authorized to perform transactions.

In the second configuration of FIG. 4D, the transaction card 100a is shown with the first card portion 152a and the second card portion 154a aligned and coupled together (e.g., the connectors 178a are inserted into the connectors 182a) such that a complete or whole transaction card 100a is formed. When coupled or aligned, the first magnetic stripe portion 176a and the second magnetic stripe portion 180a may form the whole or complete magnetic stripe 184a. The complete magnetic stripe 184a may be readable in a magnetic stripe reader. The complete magnetic stripe 184a may indicate the transaction card 100a, and thus the user, is authorized to perform a transaction. That is, when the complete transaction card 100a is inserted into a conventional magnetic stripe reading machine (e.g., by swiping in a magnetic stripe reader), the user's account may be authorized to complete the transaction and the respective monetary amount of the transaction may be posted to the user's account.

Referring to FIGS. 4A-4D, the transaction card 100 and the transaction card 100a may be different transaction cards. In an exemplary embodiment, the transaction card 100 and the transaction card 100a may be the same transaction card. In an exemplary embodiment, the transaction card may include the chip on one side of the card and the magnetic stripe on the other side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine. In an exemplary embodiment, the transaction card may include the chip and the magnetic stripe on the same side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine.

Although FIGS. 4A-4D, and the exemplary embodiment where FIGS. 4A and 4B and FIGS. 4C and 4D are combined, show and describe the chip and the magnetic stripe having separate portions coupled together, other account information may be provided. For example, the user's name, the user's account number, the user's address, the user's signature, etc. may be provided in two or more portions such that in one configuration the information is separated and in another configuration, the information is complete. Any number of pieces of account information may be removably coupleable on the transaction card. Although described as separated into two portions, more portions may be provided. Although described as magnetic stripes and chips, other types may also be provided. Where more than two portions are provided, additional connectors may be provided on additional sides to allow for coupling of the additional card portions together.

In FIGS. 4A-4D, the one or more connectors may be located on the front surface, the rear surface, a side surface of the transaction card (e.g., a surface perpendicular to the front surface), within the body of the transaction card, or combinations thereof. Although depicted along the third side, the one or more connectors may be provided on the opposing side or one of the adjacent sides, or any combination thereof. The one or more connectors may be located such that they align with a respective one of the one or more connectors on another card portion. A user may align the sides of the card portions also aligning respective connectors on each side. In this manner, when aligned, the card portions may form a complete transaction card.

Figure 5A:
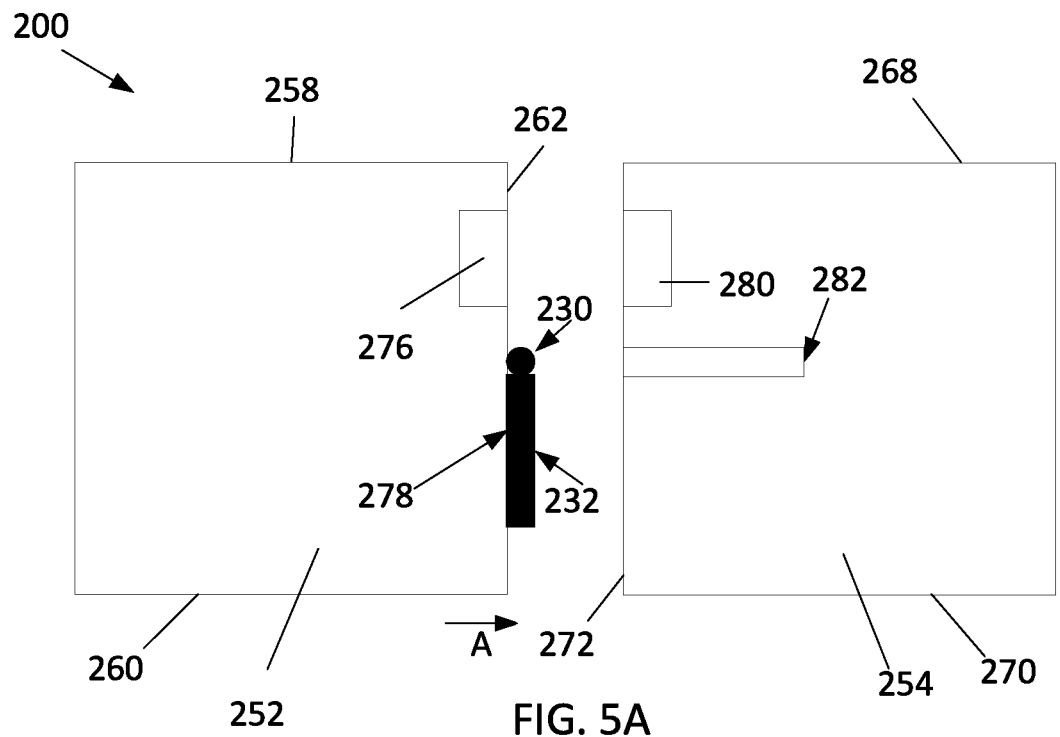
FIG. 5A shows a view of an exemplary transaction card in a first configuration.
Figure 5B:
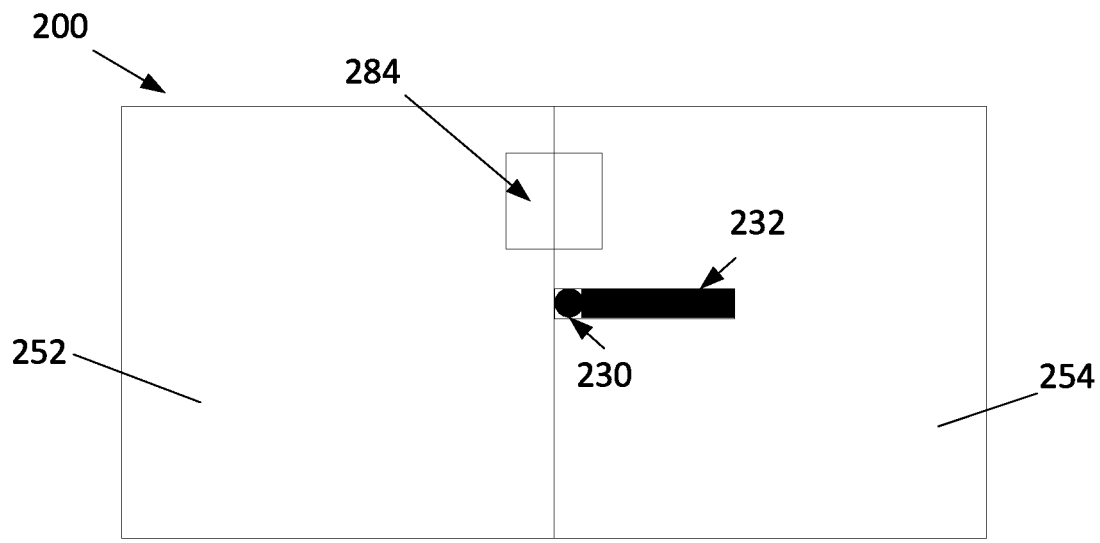
FIG. 5B shows a view of the exemplary transaction card of FIG. 5A in a second configuration.

Referring to FIGS. 5A and 5B, transaction card 200 is shown. The transaction card 200 may be the same or similar as the transaction cards 10, 50, 50a, 100, and/or 100a. The transaction card 200 may include any of the aforementioned features and variations described with respect to transaction cards 10, 50, 50a, 100, and/or 100a. Features not described with respect to FIGS. 5A and 5B may be the same or similar as features previously described. The transaction card 200 may include a first card portion 252 and a second card portion 254. The first card portion 252 may include a chip portion 276 located closer to a first side 258 than a second side 260, as described with respect to FIGS. 2A and 2B. The second card portion 254 may include a chip portion 280 located closer to a first side 268 than to a second side 270, as described with respect to FIGS. 2A and 2B. The first card portion 252 may include one or more connectors 278. At least one of the connectors may overlap at least a portion of the chip portion 276, as described with respect to FIGS. 2A and 2B. The second card portion 254 may include one or more connectors 282. At least one of the connectors may overlap at least a portion of the chip portion 280, as described with respect to FIGS. 2A and 2B. Although a single connector is shown, more may be provided. The number of connectors on each card portion may be complimentary with the other card portion. The connectors may be positioned such that they are aligned with connectors on the other card portion.

The one or more connectors 278, 282 may be a mechanical coupling. For example, the connector 278 may be a male connector and the connector 282 may be a female connector. For example, the connector 278 may be a protrusion sized and shaped to fit within the connector 282. The connector 278 may be a single large male connector that may swivel with respect to the first card portion 252. For example, the connector 278 may include a hinge or pivot or swivel point 230 and a protrusion portion 232.

To couple the first card portion 252 to the second card portion 254, the protrusion portion 232 of the connector 278 may be rotated about the swivel point 230 from the position of FIG. 4A to the position of FIG. 4B. That is, the protrusion portion 232 may be rotated from a first configuration aligned with and substantially parallel with the side 262 (FIG. 5A) to a second configuration aligned with and substantially parallel with the side 260 (FIG. 5B). The connector 278 may protrude away from the side 262 in the direction of the arrow A in the second configuration (FIG. 5B). Once rotated or pivoted, the protrusion portion 232 may slide or move into the connector 282 which may be a recess, slot, or groove. The connector 282 may be sized and shaped to accommodate both the swivel point 230 and the protrusion portion 232. Although depicted on an outer surface of the first card portion 252, the swivel point 230 and/or the protrusion portion 232 may be located within the body of the first card portion 252. In this manner, the swivel point 230 and/or the protrusion portion 232 may be flush with the side 262 when the connector 278 is in the first configuration of FIG. 5A.

The protrusion portion 232 of the connector 278 may be one or more protrusions, pins or other extending member that may be configured to extend outwardly from the first card portion 252. The connector 282 may be one or more recesses, slots, grooves, etc. sized and shaped to receive a respective connector 278. The connector 282 may recess inwardly from the side 272 in the direction of arrow A.

Although depicted as rectangular protrusion and recess, the connectors 278, 282 may be any complementary shapes (e.g., triangular, polygonal, pentagonal, semi-spherical, etc.). When aligned, the protruding connector 278 may be inserted into the recessed connector 282. The male and female connectors may engage one other to couple the first card portion 252 and the second card portion 254 to form the transaction card 200 as shown in FIG. 5B. The male and female connectors may maintain the transaction card 200 in the complete or whole configuration. One or more locks may be provided to maintain the transaction card 200 in the complete or whole configuration after coupling of the male and female connectors. Although shown and described with the male connector on the first card portion 252 and the female connector on the second card portion 254, the arrangement may be reversed. Although shown and described as male and female mechanical connectors, other connection types are contemplated, such as, for example magnets, other protrusions, indents, snap connections, slide connections, toggles, removable adhesive, etc.

The transaction card 200 may have a first configuration (FIG. 5A) and a second configuration (FIG. 5B). The first card portion 252 and the second card portion 254 may be removably coupleable or connectable. That is, in the first configuration of FIG. 5A, the first card portion 252 and the second card portion 254 may be separate or not coupled. The first configuration may be a disconnected configuration. In the first configuration, the connectors 278 and 282 may be disengaged or disconnected. In the first configuration, the transaction card 200 may be incomplete or inoperable. That is, in the first configuration, the transaction card 200 may not be readable by a chip reader. In the first configuration, the transaction card 200 may not be authorized to perform transactions. In the first configuration, the transaction card 200 may be incomplete and may include an incomplete chip (e.g., comprised of chip portions 276, 280 not coupled together). Inserting the first card portion 252 and/or the second card portion 254 into a card reading machine may result in the transaction card 200 being unreadable by the machine. In this configuration, a transaction may not be completed and may not be authorized.

In the second configuration of FIG. 5B, the first card portion 252 and the second card portion 254 may be coupled or connected. The second configuration may be a connected configuration. In the second configuration, the connectors 278 and 282 may be coupled, connected, or otherwise latched together. In the second configuration, the transaction card 200 may be complete or operable. That is, in the second configuration, the transaction card 200 may be readable by a chip reader. In the second configuration, the transaction card 200 may be authorized to perform transactions.

In the second configuration of FIG. 5B, the transaction card 200 is shown with the first card portion 252 and the second card portion 254 aligned and coupled together (e.g., the connector 278 is inserted into the connector 282) such that a complete or whole transaction card 200 is formed. When coupled or aligned, the first chip portion 276 and the second chip portion 280 may form the whole or complete chip 284. The complete chip 284 may be readable in a chip reader. The complete chip 284 may indicate the transaction card 200, and thus the user, is authorized to perform a transaction. That is, when the complete transaction card 200 is inserted into a conventional chip reading machine (e.g., by insertion into the chip reader), the user's account may be authorized to complete the transaction and the respective monetary amount of the transaction may be posted to the user's account.

Figure 5C:
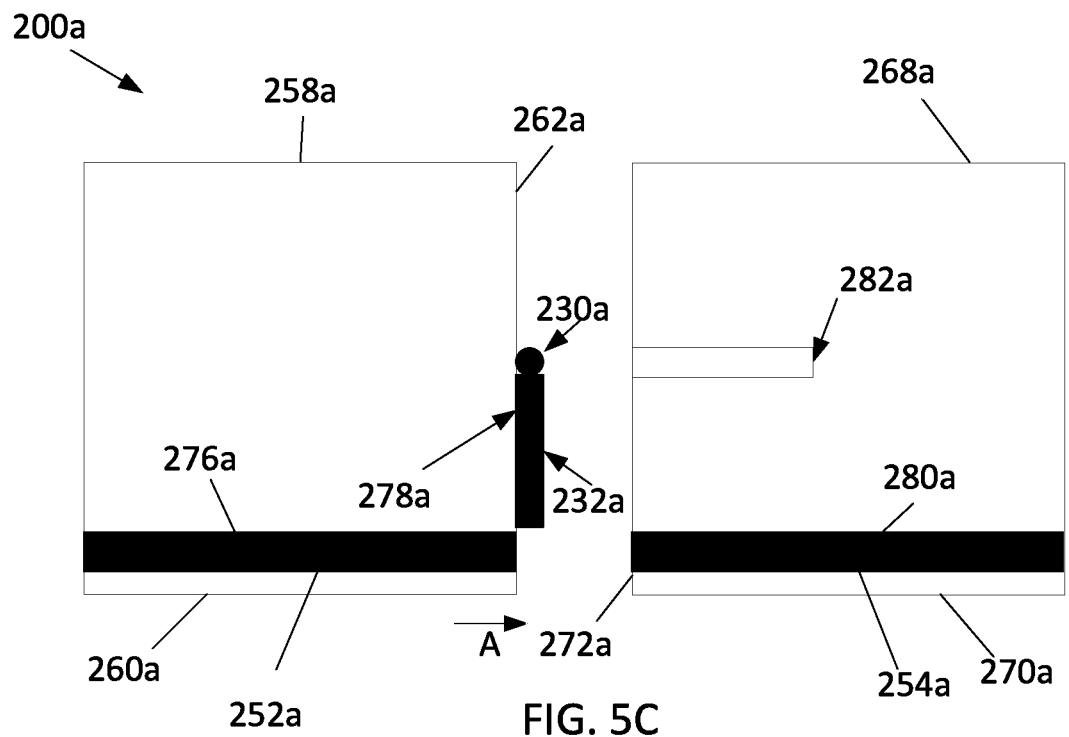
FIG. 5C shows a view of an exemplary transaction card in a first configuration.
Figure 5D:
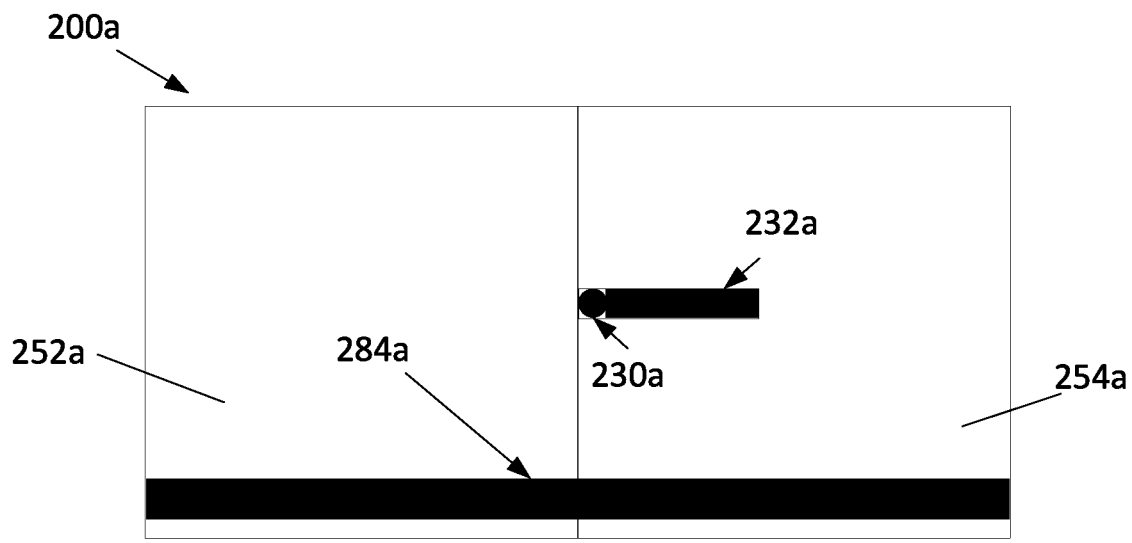
FIG. 5D shows a view of the exemplary transaction card of FIG. 5C in a second configuration.

Referring to FIGS. 5C and 5D, transaction card 200a is shown. The transaction card 200a may be the same or similar as the transaction cards 10, 50, 50a, 100, 100a, and/or 200. The transaction card 200a may include any of the aforementioned features and variations described with respect to transaction cards 10, 50, 50a, 100, 100a, and/or 200. Features not described with respect to FIGS. 5C and 5D may be the same or similar as features previously described. The transaction card 200a may include a first card portion 252a and a second card portion 254a. The first card portion 252a may include a magnetic stripe portion 276a located closer to a second side 260a than a first side 258a, as described with respect to FIGS. 3A and 3B. The second card portion 254a may include a magnetic stripe portion 280a located closer to a second side 270a than a first side 268a, as described with respect to FIGS. 3A and 3B. The first card portion 252a may include one or more connectors 278a. At least one of the connectors may overlap at least a portion of the magnetic stripe portion 276a, as described with respect to FIGS. 3A and 3B. The second card portion 254a may include one or more connectors 282a. At least one of the connectors may overlap at least a portion of the magnetic stripe portion 280a, as described with respect to FIGS. 3A and 3B. Although a single connector is shown, more may be provided. The number of connectors on each card portion may be complimentary with the other card portion. The connectors may be positioned such that they are aligned with connectors on the other card portion.

The one or more connectors 278a, 282a may be a mechanical coupling, such as described with respect to FIGS. 5A and 5B. The connectors 278a, 282a may have the same or similar features and/or variations and may operate in the same or similar manner as the connectors 278 and 282 as described with respect to FIGS. 5A and 5B.

The transaction card 200a may have a first configuration (FIG. 5C) and a second configuration (FIG. 5D). The first card portion 252a and the second card portion 254a may be removably coupleable or connectable. That is, in the first configuration of FIG. 5C, the first card portion 252a and the second card portion 254a may be separate or not coupled. The first configuration may be a disconnected configuration. In the first configuration, the connectors 278a and 282a may be disengaged or disconnected. In the first configuration, the transaction card 200a may be incomplete or inoperable. That is, in the first configuration, the transaction card 200a may not be readable by a magnetic stripe reader. In the first configuration, the transaction card 200a may not be authorized to perform transactions. In the first configuration, the transaction card 200a may be incomplete and may include an incomplete magnetic stripe (e.g., comprised of magnetic stripe portions 276a, 180a not coupled together). Inserting the first card portion 252a and/or the second card portion 254a into a magnetic stripe reading machine may result in the transaction card 200a being unreadable by the machine. In this configuration, a transaction may not be completed and may not be authorized.

In the second configuration of FIG. 5D, the first card portion 252a and the second card portion 254a may be coupled or connected. The second configuration may be a connected configuration. In the second configuration, the connectors 278a and 282a may be coupled, connected, or otherwise latched together. In the second configuration, the transaction card 200a may be complete or operable. That is, in the second configuration, the transaction card 200a may be readable by a magnetic stripe reader. In the second configuration, the transaction card 200a may be authorized to perform transactions.

In the second configuration of FIG. 5D, the transaction card 200a is shown with the first card portion 252a and the second card portion 254a aligned and coupled together (e.g., the connectors 278a are inserted into the connectors 282a) such that a complete or whole transaction card 200a is formed. When coupled or aligned, the first magnetic stripe portion 276a and the second magnetic stripe portion 280a may form the whole or complete magnetic stripe 284a. The complete magnetic stripe 284a may be readable in a magnetic stripe reader. The complete magnetic stripe 284a may indicate the transaction card 200a, and thus the user, is authorized to perform a transaction. That is, when the complete transaction card 200a is inserted into a conventional magnetic stripe reading machine (e.g., by swiping in a magnetic stripe reader), the user's account may be authorized to complete the transaction and the respective monetary amount of the transaction may be posted to the user's account.

Referring to FIGS. 5A-5D, the transaction card 200 and the transaction card 200a may be different transaction cards. In an exemplary embodiment, the transaction card 200 and the transaction card 200a may be the same transaction card. In an exemplary embodiment, the transaction card may include the chip on one side of the card and the magnetic stripe on the other side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine. In an exemplary embodiment, the transaction card may include the chip and the magnetic stripe on the same side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine.

Although FIGS. 5A-5D, and the exemplary embodiment where FIGS. 5A and 5B and FIGS. 5C and 5D are combined, show and describe the chip and the magnetic stripe having separate portions coupled together, other account information may be provided. For example, the user's name, the user's account number, the user's address, the user's signature, etc. may be provided in two or more portions such that in one configuration the information is separated and in another configuration, the information is complete. Any number of pieces of account information may be removably coupleable on the transaction card. Although described as separated into two portions, more portions may be provided. Although described as magnetic stripes and chips, other types may also be provided. Where more than two portions are provided, additional connectors may be provided on additional sides to allow for coupling of the additional card portions together.

In FIGS. 5A-5D, the connectors may be located on the front surface, the rear surface, a side surface of the transaction card (e.g., a surface perpendicular to the front surface), within the body of the transaction card, or combinations thereof. Although depicted along the third side, the one or more connectors may be provided on the opposing side or one of the adjacent sides, or any combination thereof. The one or more connectors may be located such that they align with a respective one of the one or more connectors on another card portion. A user may align the sides of the card portions also aligning respective connectors on each side. In this manner, when aligned, the card portions may form a complete transaction card.

Figure 6A:
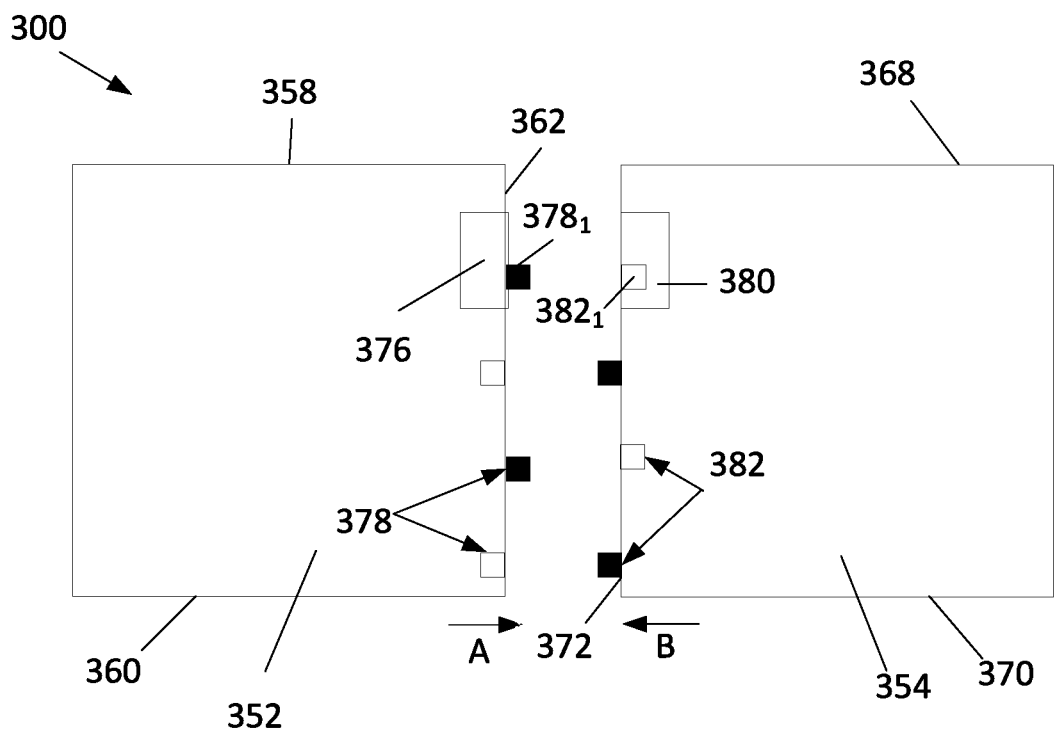
FIG. 6A shows a view of an exemplary transaction card in a first configuration.
Figure 6B:
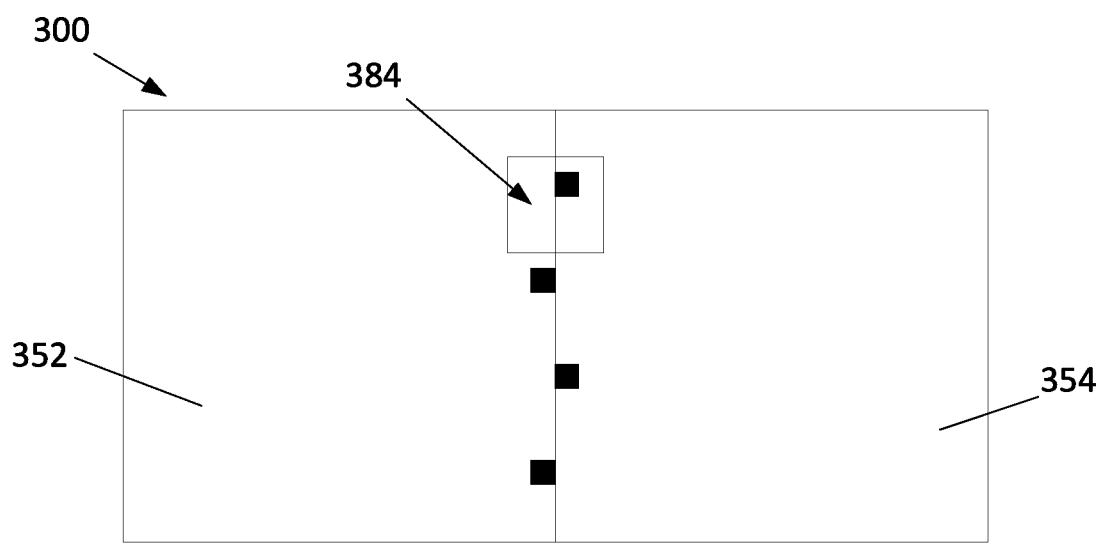
FIG. 6B shows a view of the exemplary transaction card of FIG. 6A in a second configuration.

Referring to FIGS. 6A and 6B, transaction card 300 is shown. The transaction card 300 may be the same or similar as the transaction cards 10, 50, 50a, 100, 100a, 200, and/or 200a. The transaction card 10, 50, 50a, 100, 100a, 200, and/or 200a may include any of the aforementioned features and variations described with respect to transaction cards 10, 50, 50a, 100, 100a, 200, and/or 200a. Features not described with respect to FIGS. 6A and 6B may be the same or similar as features previously described. The transaction card 300 may include a first card portion 352 and a second card portion 354. The first card portion 352 may include a chip portion 376 located closer to a first side 358 than a second side 360, as described with respect to FIGS. 2A and 2B. The second card portion 354 may include a chip portion 380 located closer to a first side 368 than to a second side 370, as described with respect to FIGS. 2A and 2B. The first card portion 352 may include one or more connectors 378. At least one of the connectors $378_1$ may overlap at least a portion of the chip portion 376, as described with respect to FIGS. 2A and 2B. The second card portion 354 may include one or more connectors 382. At least one of the connectors $382_1$ may overlap at least a portion of the chip portion 380, as described with respect to FIGS. 2A and 2B. Although four connectors are shown, more or fewer may be provided. The number of connectors on each card portion may be complimentary with the other card portion. The connectors may be positioned such that they are aligned with connectors on the other card portion.

The one or more connectors 378, 382 may be mechanical couplings. For example, the one or more connectors 378 may be alternating male and female connectors and the one or more connectors 382 may be, respective to the connectors 378, alternating female and male connectors. Although shown as beginning and ending with a male connector, the alternating connectors 378 may begin and end with a female connector, begin with a female connector and end with a male connector, begin with a male connector and end with a female connector, may alternate other than 1:1 of male: female connectors, or other variations. The alternating connectors 382 may be configured to mate with the respective connectors 378 and may thus also alternate in any number of patterns as described with respect to connectors 378.

For example, the one or more connectors 378 may be alternating protrusions and recesses sized and shaped to mate or cooperate with respectively alternative recesses and protrusions of the one or more connectors 382. The one or more connectors 378, 382 that are male connectors may protrude away from the side 362, 372 in the direction of arrows A, B, respectively. The one or more connectors 378, 382 that are female connectors may recess inwardly from the sides 362, 372, respectively. The protrusions and recesses may occur in an alternating manner. The one or more connectors 378, 382 that are male connectors may be protrusions, pins or other extending member that extend outwardly from the first card portion 352 and second card portion 354, respectively. The one or more connectors 378, 382 that are female connectors may be recesses, slots, grooves, etc. sized and shaped to receive the one or more male connectors. Although depicted as rectangular protrusions and recesses, the one or more connectors 378, 382 may be any complementary shapes (e.g., triangular, polygonal, pentagonal, semi-spherical, etc.). When aligned, respective male and female connectors of the one or more connectors 378 may mate with the respective female and male connectors of the one or more connectors 382.

When aligned, the protruding one or more connectors 378, 382 may be inserted into the respective recessed one or more connectors 378, 382. The male and female connectors may engage one other to couple the first card portion 352 and the second card portion 354 to form the transaction card 300. The male and female connectors may maintain the transaction card 300 in the complete or whole configuration. One or more locks may be provided to maintain the transaction card 300 in the complete or whole configuration after coupling of the male and female connectors. Although shown and described with the male connectors on the first card portion 352 and the female connectors on the second card portion 354, the arrangement may be reversed. Although shown and described as male and female mechanical connectors, other connection types are contemplated, such as, for example magnets, other protrusions, indents, snap connections, slide connections, toggles, removable adhesive, etc.

The transaction card 300 may have a first configuration (FIG. 6A) and a second configuration (FIG. 6B). The first card portion 352 and the second card portion 354 may be removably coupleable or connectable. That is, in the first configuration of FIG. 6A, the first card portion 352 and the second card portion 354 may be separate or not coupled. The first configuration may be a disconnected configuration. In the first configuration, the connectors 378 and 382 may be disengaged or disconnected. In the first configuration, the transaction card 300 may be incomplete or inoperable. That is, in the first configuration, the transaction card 300 may not be readable by a chip reader. In the first configuration, the transaction card 300 may not be authorized to perform transactions. In the first configuration, the transaction card 300 may be incomplete and may include an incomplete chip (e.g., comprised of chip portions 376, 380 not coupled together). Inserting the first card portion 352 and/or the second card portion 354 into a card reading machine may result in the transaction card 300 being unreadable by the machine. In this configuration, a transaction may not be completed and may not be authorized.

In the second configuration of FIG. 6B, the first card portion 352 and the second card portion 354 may be coupled or connected. The second configuration may be a connected configuration. In the second configuration, the connectors 378 and 382 may be coupled, connected, or otherwise latched together. In the second configuration, the transaction card 300 may be complete or operable. That is, in the second configuration, the transaction card 300 may be readable by a chip reader. In the second configuration, the transaction card 300 may be authorized to perform transactions.

In the second configuration of FIG. 6B, the transaction card 300 is shown with the first card portion 352 and the second card portion 354 aligned and coupled together (e.g., the connectors 378, 382 are inserted into respective connectors 382, 378) such that a complete or whole transaction card 300 is formed. When coupled or aligned, the first chip portion 376 and the second chip portion 380 may form the whole or complete chip 384. The complete chip 384 may be readable in a chip reader. The complete chip 384 may indicate the transaction card 300, and thus the user, is authorized to perform a transaction. That is, when the complete transaction card 300 is inserted into a conventional chip reading machine (e.g., by insertion into the chip reader), the user's account may be authorized to complete the transaction and the respective monetary amount of the transaction may be posted to the user's account.

Figure 6C:
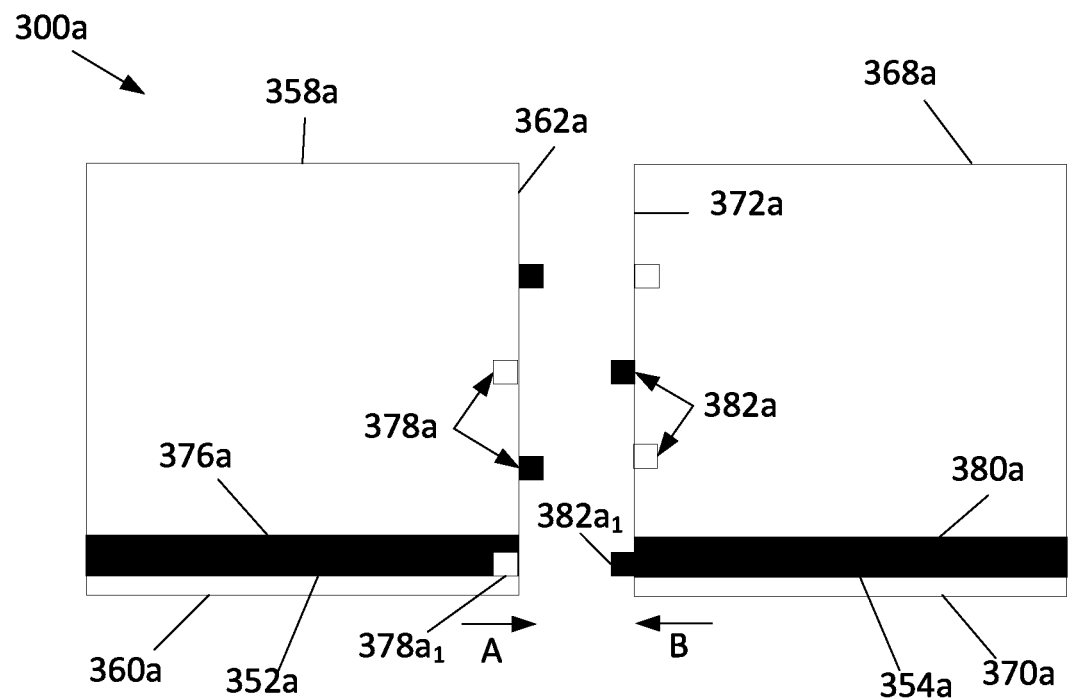
FIG. 6C shows a view of an exemplary transaction card in a first configuration.
Figure 6D:
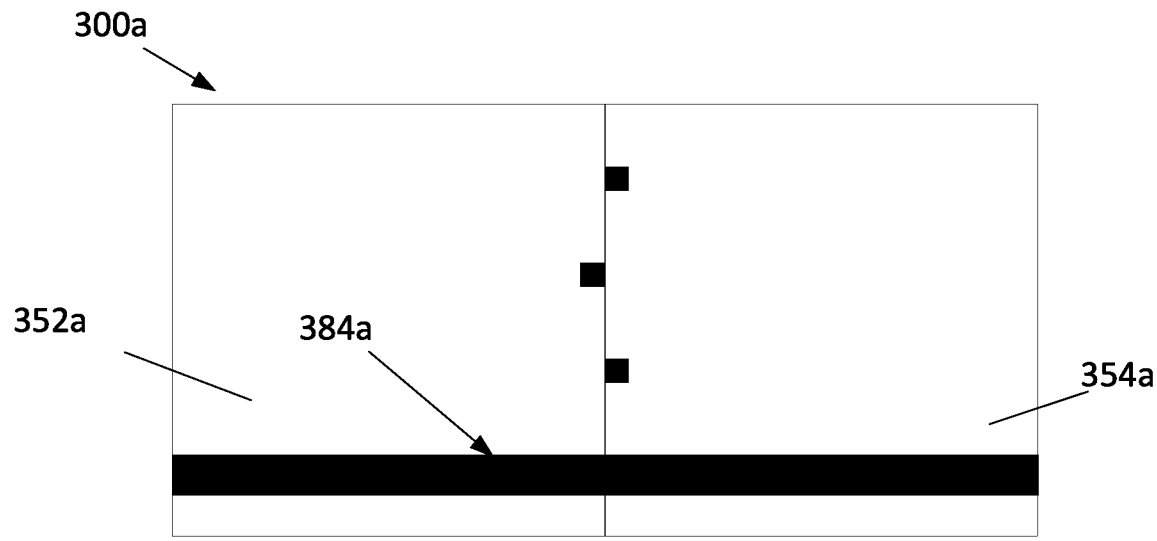
FIG. 6D shows a view of the exemplary transaction card of FIG. 6C in a second configuration.

Referring to FIGS. 6C and 6D, transaction card 300a is shown. The transaction card 300a may be the same or similar as the transaction cards 10, 50, 50a, 100, 100a, 200, 200a, and/or 300. The transaction card 300a may include any of the aforementioned features and variations described with respect to transaction cards 10, 50, 50a, 100, 100a, 200, 200a, and/or 300. Features not described with respect to FIGS. 6C and 6D may be the same or similar as features previously described. The transaction card 300a may include a first card portion 352a and a second card portion 354a. The first card portion 352a may include a magnetic stripe portion 376a located closer to a second side 360a than a first side 358a, as described with respect to FIGS. 3A and 3B. The second card portion 354a may include a magnetic stripe portion 380a located closer to a second side 370a than a first side 368a, as described with respect to FIGS. 3A and 3B. The first card portion 352a may include one or more connectors 378a. At least one of the connectors $378a_1$ may overlap at least a portion of the magnetic stripe portion 376a, as described with respect to FIGS. 3A and 3B. The second card portion 354a may include one or more connectors 382a. At least one of the connectors $382a_1$ may overlap at least a portion of the magnetic stripe portion 380a, as described with respect to FIGS. 3A and 3B. Although four connectors are shown, more or fewer may be provided. The number of connectors on each card portion may be complimentary with the other card portion. The connectors may be positioned such that they are aligned with connectors on the other card portion.

The one or more connectors 378a, 382a may be mechanical couplings, such as described with respect to FIGS. 6A and 6B. The one or more connectors 378a, 382a may have the same or similar features and/or variations and may operate in the same or similar manner as the connectors 378 and 382 as described with respect to FIGS. 6A and 6B.

The transaction card 300a may have a first configuration (FIG. 6C) and a second configuration (FIG. 6D). The first card portion 352a and the second card portion 354a may be removably coupleable or connectable. That is, in the first configuration of FIG. 6C, the first card portion 352a and the second card portion 354a may be separate or not coupled. The first configuration may be a disconnected configuration. In the first configuration, the connectors 378a and 382a may be disengaged or disconnected. In the first configuration, the transaction card 300a may be incomplete or inoperable. That is, in the first configuration, the transaction card 300a may not be readable by a magnetic stripe reader. In the first configuration, the transaction card 300a may not be authorized to perform transactions. In the first configuration, the transaction card 300a may be incomplete and may include an incomplete magnetic stripe (e.g., comprised of magnetic stripe portions 376a, 380a not coupled together). Inserting the first card portion 352a and/or the second card portion 354a into a magnetic stripe reading machine may result in the transaction card 300a being unreadable by the machine. In this configuration, a transaction may not be completed and may not be authorized.

In the second configuration of FIG. 6D, the first card portion 352a and the second card portion 354a may be coupled or connected. The second configuration may be a connected configuration. In the second configuration, the connectors 378a and 382a may be coupled, connected, or otherwise latched together. In the second configuration, the transaction card 300a may be complete or operable. That is, in the second configuration, the transaction card 300a may be readable by a magnetic stripe reader. In the second configuration, the transaction card 300a may be authorized to perform transactions.

In the second configuration of FIG. 6D, the transaction card 300a is shown with the first card portion 352a and the second card portion 354a aligned and coupled together (e.g., the connectors 378a are inserted into the connectors 382a) such that a complete or whole transaction card 300a is formed. When coupled or aligned, the first magnetic stripe portion 376a and the second magnetic stripe portion 380a may form the whole or complete magnetic stripe 384a. The complete magnetic stripe 384a may be readable in a magnetic stripe reader. The complete magnetic stripe 384a may indicate the transaction card 300a, and thus the user, is authorized to perform a transaction. That is, when the complete transaction card 300a is inserted into a conventional magnetic stripe reading machine (e.g., by swiping in a magnetic stripe reader), the user's account may be authorized to complete the transaction and the respective monetary amount of the transaction may be posted to the user's account.

Referring to FIGS. 6A-6D, the transaction card 300 and the transaction card 300a may be different transaction cards. In an exemplary embodiment, the transaction card 300 and the transaction card 300a may be the same transaction card. In an exemplary embodiment, the transaction card may include the chip on one side of the card and the magnetic stripe on the other side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine. In an exemplary embodiment, the transaction card may include the chip and the magnetic stripe on the same side of the card. In this exemplary embodiment, the connectors may overlap at least a portion of each of the chip portions and the magnetic stripe portions. In this exemplary embodiment, when coupled together, the complete transaction card may be operable in both a chip reading machine and a magnetic stripe reading machine.

Although FIGS. 6A-6D, and the exemplary embodiment where FIGS. 6A and 6B and FIGS. 6C and 6D are combined, show and describe the chip and the magnetic stripe having separate portions coupled together, other account information may be provided. For example, the user's name, the user's account number, the user's address, the user's signature, etc. may be provided in two or more portions such that in one configuration the information is separated and in another configuration, the information is complete. Any number of pieces of account information may be removably coupleable on the transaction card. Although described as separated into two portions, more portions may be provided. Although described as magnetic stripes and chips, other types may also be provided. Where more than two portions are provided, additional connectors may be provided on additional sides to allow for coupling of the additional card portions together.

In FIGS. 6A-6D, the one or more connectors may be located on the front surface, the rear surface, a side surface of the transaction card (e.g., a surface perpendicular to the front surface), within the body of the transaction card, or combinations thereof. Although depicted along the third side, the one or more connectors may be provided on the opposing side or one of the adjacent sides, or any combination thereof. The one or more connectors may be located such that they align with a respective one of the one or more connectors on another card portion. A user may align the sides of the card portions also aligning respective connectors on each side. In this manner, when aligned, the card portions may form a complete transaction card.

Although shown as divided or split down a central axis of the transaction card, any of the aforementioned embodiments may be split along any axis (e.g., along a horizontal axis or non-central axis) and/or may be divided into any number of pieces (e.g., more than two). The divide or split may be provided anywhere along the transaction card such that the card becomes two or more components and divides at least one piece of personal identification information into two or more components.

Although the connectors are shown as being visible after coupled together, any of the aforementioned examples may include connectors which are not visible before coupling, after coupling, or both before and after coupling. Any combination of the aforementioned connector types may be combined onto a single exemplary transaction card. For example, the transaction card may include both mechanical connectors (e.g., FIGS. 4, 5, 6) and magnetic connectors (FIGS. 2, 3).

A lock or locking mechanism may be provided on any of the aforementioned embodiments to secure the coupling of the multiple transaction card portions. The lock may be latch. The lock may be a metal insertion piece that securely couples the portions together in addition to the connectors described herein. The lock may be a magnetic connection. The magnetic lock may be configured such that it does not interfere with WiFi payments or the magnetic stripe.

Referring to FIGS. 7A-7D, an exemplary transaction card 400 is shown. The transaction card 400 may be the same or similar as the transaction cards 10, 50, 50*a*, 100, 100*a*, 200, 200*a*, 300, and/or 300*a*. The transaction card 400 may include any of the aforementioned features and variations described with respect to transaction cards 10, 50, 50*a*, 100, 100*a*, 200, 200*a*, 300, and/or 300*a*. Although connectors are not shown in FIGS. 7A-7D, any combination of the aforementioned described connectors may be provided on the transaction card 400. Any features, variations, or arrangements described with respect to other embodiments may be present in FIGS. 7A-7D.

The transaction card 400 may be a multi-configuration transaction card. The transaction card 400 may include a first card portion 402 and a second card portion 404. The first card portion 402 may have an outer periphery or perimeter 406. The first card portion 402 may have a first side 408, a second side 410, a third side 412, and a fourth side 414. The first side 408 may be opposite from the second side 410. The third side 412 may be opposite from the fourth side 414. The second card portion 404 may have an outer periphery or perimeter 420. The second card portion 404 may have a first side 422, a second side 424, a third side 426, and a fourth side 428. The first side 422 may be opposite from the second side 424. The third side 426 may be opposite from the fourth side 428.

The first card portion 402 may include a chip portion 416 and a magnetic stripe portion 418. Although shown on the same face of the transaction card 400, the chip portion 416, the magnetic stripe portion 418, or both, may be on the opposing face of the transaction card 400. The second card portion 404 may include a chip portion 430 and a magnetic stripe portion 432. Although shown on the same face of the transaction card 400, the chip portion 430, the magnetic stripe portion 432, or both, may be on the opposing face of the transaction card 400.

The transaction card 400 may have multiple configurations. In the configuration of FIG. 7A, the transaction card 400 may be incomplete. The chip portions 416, 430 and the magnetic stripe portions 418, 432 may be misaligned, uncoupled, or both. The transaction card 400 may be disabled and may not be usable in a card reading machine. Bringing the second side 410 of the first card portion 402 and the second side 424 of the second card portion 404 into alignment, the configuration of FIG. 7A may be moved to the configuration of FIG. 7C. The coupling of the first card portion 402 and the second card portion 404 may be performed with any of the aforementioned connectors. The configuration of FIG. 7C may result in a chip card. That is, the transaction card 400 in FIG. 7C may have a complete, enabled chip 434. The configuration of FIG. 7C may have an incomplete, disabled swipe or magnetic stripe portions 418, 432. In the configuration of FIG. 7C, the complete chip 434 may be enabled and thus readable in a chip reading machine. In the configuration of FIG. 7C, the magnetic stripe portions 418, 432 may be disabled and thus not readable by a magnetic stripe reading machine.

In the configuration of FIG. 7B, the transaction card 400 may be incomplete. The chip portions 416, 430 and the magnetic stripe portions 418, 432 may be misaligned, uncoupled, or both. The transaction card 400 may be disabled and may not be usable in a card reading machine. Bringing the third side 412 of the first card portion 402 and the third side 426 of the second card portion 404 into alignment, the configuration of FIG. 7B may be moved to the configuration of FIG. 7D. The coupling of the first card portion 402 and the second card portion 404 may be performed with any of the aforementioned connectors. The configuration of FIG. 7D may result in a magnetic stripe card. That is, the transaction card 400 in FIG. 7D may have a complete, enabled magnetic stripe 436. The configuration of FIG. 7D may have an incomplete, disabled chip portions 416, 430. In the configuration of FIG. 7D, the magnetic stripe 436 may be enabled and thus readable by a magnetic stripe reading machine. In the configuration of FIG. 7D, the chip portions 416, 430 may be disabled and thus not readable by a chip reading machine.

A conventional transaction card may have a predetermined width X and a predetermined length Y. The sides 412 and 414 of the first card portion 402 may be the same dimension and may be aligned with a width. The sides 408 and 410 of the first card portion 402 may be the same dimension and may be aligned with the length. The width and the length of the first card portion 402 may be half of the predetermined width X and length Y (e.g., X/2 and Y/2). The sides 426 and 428 the second card portion 404 may be the same dimension and may be aligned with a width. The sides 422 and 424 of the second card portion 404 may be the same dimension and may be aligned with the length. The width and length of the second card portion 404 may be half of the predetermined width X and length Y (e.g., X/2 and Y/2).

When in the configuration of FIG. 7C, the widths of the first card portion 402 and the second card portion 404 may come together such that the width of the completed transaction card is equal to the predetermined width X of a conventional transaction card. In this manner, in the configuration of FIG. 7C, the transaction card 400 is operable with a chip reading machine. When in the configuration of FIG. 7D, the lengths of the first card portion 402 and the second card portion 404 may come together such that the length of the completed transaction card is equal to the predetermined length Y of a conventional transaction card. In this manner, in the configuration of FIG. 7D, the transaction card 400 is operable with a magnetic stripe reading machine.

Although described as being half, the width and/or length may be any fraction of the whole of the predetermined width and/or length such that the sum of the parts is equal to the width of the predetermined width X and/or the width of the predetermined width Y of the conventional transaction card. Where the width and/or length are not half, the location of the magnetic stripe and/or chip may be moved such that it is located a predetermined distance from the perimeter of the transaction card to be operable with a conventional card reading machine.

The transaction cards of the present disclosure may allow for a multi-factor authentication system and method. The first card portion may represent the first authentication factor. The second card portion may represent the second authentication factor. To authenticate a purchase and or transaction, both authentication factors may be presented at the time of the transaction. The transaction card may be unable to authorize a transaction without all of the portions of the transaction card.

To authenticate a purchase, the authorized user(s) may mate the first authentication factor and the second authentication factor is configured to authenticate a user, the mating resulting in a complete transaction card formed by the first card portion and the second card portion. The mating may be performed with any of the aforementioned connectors or combinations thereof. The complete transaction card may form a complete authentication component formed of a first half of the first authentication factor and a second half of the second authentication factor. The complete authentication component may be operable to be read in a card reading machine only upon successful authentication of the user. Successful authentication of the user may be represented by the proper completion of the authentication factors (e.g., proper connection and completion of the transaction card).

In any of the aforementioned exemplary transaction cards, the chip may be located a predetermined distance from one or more sides of the transaction card. This may allow for the chip to be compatible with a chip reading machine when the two or more portions of the chip are brought together to form the complete chip. Likewise, the magnetic stripe may be located a predetermined distance from one or more sides of the transaction card. This may allow for the magnetic stripe to be compatible with a magnetic stripe reading machine when the two or more portions of the magnetic stripe are brought together to form the complete magnetic stripe.

A conventional transaction card may have a predetermined width X and a predetermined length Y. In any of the aforementioned exemplary transaction cards, the length of each card portion may be the same as the lengthy Y of a conventional transaction card. The width of each card portion may be less than the predetermined width X (e.g., half of the predetermined width X) such that the sum of the widths of the card portions may be the same as the predetermined width X of the conventional transaction card, when in the complete configuration. In any of the aforementioned exemplary transaction cards, the width of each card portion may be the same as the width X of a conventional transaction card. The length of each card portion may be less than the predetermined length Y (e.g., half of the predetermined length Y) such that the sum of the lengths of the card portions may be the same as the predetermined length Y of the conventional transaction card, when in the complete configuration. In any of the aforementioned exemplary transaction cards, both the width and the length may be less than the predetermined width and length of a conventional card, but when brought together may equal the predetermined width and/or length to allow for proper functioning of the transaction card. Therefore, when in the complete configuration, the transaction card may have the conventional width X and length Y of a transaction card and be compatible with a conventional card reading machine.

The transaction card of the present disclosure and/or portions thereof may be formed of conventional transaction card materials. The transaction card of the present disclosure and/or portions thereof may be metallic or other rigid material (e.g., rigid plastic). The transaction card and/or portions thereof may be formed of a rigid material to maintain structural integrity during use of card (e.g., during multiple transitions between the disabled and enabled configurations). In an embodiment, the entire transaction card is formed of the rigid material. In an embodiment, the connectors are formed of the rigid material.

The transaction card of the present disclosure may be formed by electrical discharge machining (EDM). The connectors may be formed by EDM of a whole or complete transaction card to divide the transaction card into multiple portions. The EDM may cut vertically and/or horizontally on the transaction card to form notches/connectors. EDM results in a clean cut through the chip and magnetic stripe such that operability of the portions are disrupted by the manufacturing of the transaction card. Other methods of manufacturing the transaction card of the present disclosure are contemplated, such as, for example, molding each portion. The transaction card may be formed in multiple portions separately.

The transaction card of the present disclosure may be tested after manufacturing and/or tested after the multiple portions are brought together to authorize a transaction. The testing may confirm operability of the transaction card in the complete configuration. The transaction card may be tested in a card reader.

The transaction card of the present disclosure may include an indicator representing that the complete transaction card is in an operable configuration (e.g., that all connections are connected, the chip is functioning, the magnetic stripe is function, etc.). For example, an indicator light or LED may be provided on the transaction card. The indicator light may be provided on the chip. If the transaction card (e.g., the chip) is fully connected, then the LED may illuminate. If the transaction card is not fully connected, then the LED may not illuminate or may illuminate a different color (e.g., red for disconnected and green for connected).

The transaction card of the present disclosure may be formed such that the separable portions are unique to a particular user. That is, the particular arrangement or positioning of connectors may be unique to each user. In this manner, a person holding one portion of the card may be unable to complete the card with any generic portion or dummy portion of a transaction card. Instead, the person may require the unique portions of the transaction card provided to the authorized user.

Although described with respect to insertion into a chip reading machine or swiping in a magnetic stripe reading machine, other types of payment authorization may be provided. For example, the transaction cards of the present disclosure may be compatible with other transaction payment systems including, for example, near field communication, conventional card reading machines, wirelessly, tap and pay, or other types. That is, when in the incomplete configuration, the transaction card may not be read by these types of communication and when in the complete configuration, the transaction card may be read by these types of communication.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A transaction card comprising:
a first card portion having a first card portion outer perimeter, the first card portion including:
a first portion of a magnetic stripe located closer to a first side of the first card portion outer perimeter than to a second side of the first card portion outer perimeter, the second side of the first card portion outer perimeter being opposite the first side of the first card portion outer perimeter; and
a first portion of a chip located at the second side of the first card portion outer perimeter; and
a second card portion having a second card portion outer perimeter, the second card portion including:
a second portion of the magnetic stripe located closer to a first side of the second card portion outer perimeter than to a second side of the second card portion outer perimeter, the second side of the second card portion outer perimeter being opposite the first side of the second card portion outer perimeter; and
a second portion of the chip located at the second side of the second card portion outer perimeter; and
wherein the first card portion and the second card portion are removably coupleable to each other to form a first configuration and a second configuration, and wherein:
in the first configuration, a third side of the first card portion outer perimeter is removably coupled to a third side of the second card portion outer perimeter, the first portion of the magnetic stripe aligns with the second portion of the magnetic stripe, and the magnetic stripe is readable by a magnetic stripe reader, and
in the second configuration, the second side of the first card portion outer perimeter is removably coupled to the second side of the second card portion outer perimeter, the first portion of the chip aligns with the second portion of the chip, and the chip is readable by a chip reader.

2. The transaction card of claim 1, further comprising a plurality of first connectors on the first card portion and a plurality of second connectors on the second card portion.

3. The transaction card of claim 2, wherein the plurality of first connectors is configured to mate with the plurality of second connectors to form the first configuration.

4. The transaction card of claim 3, further comprising a plurality of third connectors on the first card portion and a plurality of fourth connectors on the second card portion.

5. The transaction card of claim 4, wherein the plurality of third connectors is configured to mate with the plurality of fourth connectors to form the second configuration.

6. The transaction card of claim 2, wherein the plurality of first and second connectors are magnetic.

7. The transaction card of claim 2, wherein the plurality of first connectors are at the first card portion outer perimeter, and the plurality of second connectors are at the second card portion outer perimeter.

8. The transaction card of claim 2, wherein the plurality of first connectors includes a plurality of male connectors and the plurality of second connectors includes a plurality of female connectors.

9. The transaction card of claim 2, wherein the plurality of first connectors includes alternating protrusions and indentations configured to mate with opposing indentations and protrusions, respectively, of the plurality of second connectors.

10. The transaction card of claim 1, further comprising a first and second connector on the first card portion, and a third and fourth connector on the second card portion, the first connector configured to mate with the third connector to form the first configuration, and the second connector configured to mate with the fourth connector to form the second configuration.

11. A transaction card comprising:
a first card portion having a first card portion outer perimeter, the first card portion including:
a first portion of a chip located closer to a first side of the first card portion outer perimeter than to a second side of the first card portion outer perimeter, the second side of the first card portion outer perimeter being opposite the first side of the first card portion outer perimeter; and
a first portion of a magnetic stripe located closer the second side of the first card portion outer perimeter than to the first side of the first card portion outer perimeter; and
a second card portion having a second card portion outer perimeter, the second card portion including:
a second portion of the chip located closer to a first side of the second card portion outer perimeter than to a second side of the second card portion outer perimeter, the second side of the second card portion outer perimeter being opposite the first side of the second card portion outer perimeter; and
a second portion of the magnetic stripe located closer to the second side of the second card portion outer perimeter than to the first side of the second card portion outer perimeter; and
wherein the first card portion and the second card portion are removably coupleable to each other to form a connected configuration, and wherein:
in the connected configuration, a third side of the first card portion outer perimeter is removably coupled to a third side of the second card portion outer perimeter, the first portion of the chip aligns with the second portion of the chip, the first portion of the magnetic stripe aligns with the second portion of the magnetic stripe.

12. The transaction card of claim 11, further comprising a plurality of first connectors on the first card portion and a plurality of second connectors on the second card portion, wherein the plurality of first connectors is configured to mate with the plurality of second connectors to form the connected configuration.

13. The transaction card of claim 12, wherein the plurality of first connectors is located at the third side of the first card portion outer perimeter, and the plurality of second connectors is located at the third side of the second card portion outer perimeter.

14. The transaction card of claim 12, wherein the plurality of first and second connectors are magnetic.

15. The transaction card of claim 12, wherein the plurality of first connectors includes a plurality of male connectors and the plurality of second connectors includes a plurality of female connectors, the plurality of male connectors configured to mate with the plurality of female connectors to form the connected configuration.

16. The transaction card of claim 12, wherein the plurality of first connectors includes alternating protrusions and indentations configured to mate with opposing indentations and protrusions, respectively, of the plurality of second connectors, to form the connected configuration.

17. The transaction card of claim 12, wherein the plurality of first and second connectors are uniformly distributed.

18. The transaction card of claim 12, wherein each of the plurality of first connectors is configured to mate with a respective one of the plurality of second connectors to form the connected configuration.

19. The transaction card of claim 12, wherein the plurality of first connectors includes a plurality of male and female connectors and the plurality of second connectors includes a plurality of male and female connectors.

20. The transaction card of claim 11, further comprising a plurality of alternating indents and protrusions on a front side of the first card portion configured to align with a corresponding plurality of alternating protrusions and indents on a rear side of the second card portion to form the connected configuration.

21. The transaction card of claim 11, further comprising a first connector on the first card portion and a second connector on the second card portion, wherein the first connector is configured to mate with the second connector to form the connected configuration.

22. A transaction card comprising:
  a first card portion having a first card portion outer perimeter, the first card portion including:
    a first portion of a magnetic stripe located closer to a first side of the first card portion outer perimeter than to a second side of the first card portion outer perimeter, the second side of the first card portion outer perimeter being opposite the first side of the first card portion outer perimeter; and
    a first portion of a chip located at the second side of the first card portion outer perimeter; and
  a second card portion having a second card portion outer perimeter, the second card portion including:
    a second portion of the magnetic stripe located closer to a first side of the second card portion outer perimeter than to a second side of the second card portion outer perimeter, the second side of the second card portion outer perimeter being opposite the first side of the second card portion outer perimeter; and
    a second portion of the chip located at the second side of the second card portion outer perimeter; and
  the first card portion and the second card portion are removably coupleable to each other to form a first configuration and a second configuration, wherein:
    in the first configuration, the first portion of the magnetic stripe aligns with the second portion of the magnetic stripe, and the magnetic stripe is readable by a magnetic stripe reader, and
    in the second configuration, the first portion of the chip aligns with the second portion of the chip, and the chip is readable by a chip reader.

\* \* \* \* \*